US012280595B2

(12) United States Patent
Wang et al.

(10) Patent No.: US 12,280,595 B2
(45) Date of Patent: Apr. 22, 2025

(54) LIQUID DISCHARGE HEAD AND LIQUID DISCHARGE DEVICE

(71) Applicant: SEIKO EPSON CORPORATION, Tokyo (JP)

(72) Inventors: Jingling Wang, Shiojiri (JP); Masaki Mori, Shiojiri (JP); Yu Shiozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 199 days.

(21) Appl. No.: 18/059,609

(22) Filed: Nov. 29, 2022

(65) Prior Publication Data

US 2023/0166497 A1 Jun. 1, 2023

(30) Foreign Application Priority Data

Nov. 30, 2021 (JP) ................................ 2021-193703

(51) Int. Cl.
*B41J 2/045* (2006.01)

(52) U.S. Cl.
CPC ....... *B41J 2/04563* (2013.01); *B41J 2/04581* (2013.01)

(58) Field of Classification Search
CPC ................ B41J 2/04563; B41J 2/04581; B41J 2002/14362; B41J 2002/14419; B41J 2002/14459; B41J 2202/03; B41J 2202/11; B41J 2/14233; B41J 2002/14491; B41J 2/14201; B41J 2/01
See application file for complete search history.

(56) References Cited

U.S. PATENT DOCUMENTS

2013/0016152 A1* 1/2013 Nonoyama .......... B41J 2/14233 347/17
2020/0227620 A1* 7/2020 Kakiuchi ........... H10N 30/2047
2023/0166497 A1* 6/2023 Wang .................. B41J 2/04581 347/14

FOREIGN PATENT DOCUMENTS

JP 2011-104916 A 6/2011

* cited by examiner

*Primary Examiner* — Justin Seo
*Assistant Examiner* — Tracey M McMillion
(74) *Attorney, Agent, or Firm* — WORKMAN NYDEGGER

(57) ABSTRACT

A liquid discharge head includes an individual electrode, a common electrode, a piezoelectric body that is provided between the individual electrode and the common electrode for applying pressure to liquid in the pressure chambers, a drive wiring that applies a voltage so as to drive the piezoelectric body, a detection resistor that is formed of the same material as any of the individual electrode, the common electrode, and the drive wiring for detecting temperature of the liquid in the pressure chambers, and a sealing substrate that has a wall portion and a ceiling portion, and protects the piezoelectric body by the wall portion and the ceiling portion. The detection resistor is provided to have a part overlapping the wall portion which is shorter than a part not overlapping the wall portion when viewed along a lamination direction of the piezoelectric body, the individual electrode, and the common electrode.

12 Claims, 12 Drawing Sheets

LIQUID DISCHARGE HEAD AND LIQUID DISCHARGE DEVICE

The present application is based on, and claims priority from JP Application Serial Number 2021-193703, filed Nov. 30, 2021, the disclosure of which is hereby incorporated by reference herein in its entirety.

BACKGROUND

1. Technical Field

The present disclosure relates to a liquid discharge head and a liquid discharge device.

2. Related Art

A liquid discharge device having a temperature detection section on the side surface of a carriage on which a liquid discharge head is mounted is known (for example, JP-A-2011-104916). The liquid discharge device changes the number of maintenance drive pulses applied to a piezoelectric element based on an environmental temperature detected by the temperature detection section.

However, when the temperature detection section is provided outside the liquid discharge head, there is a possibility that temperature detection accuracy of the ink in a pressure chamber decreases. Therefore, there is a demand for disposing the temperature detection section in the vicinity of the pressure chamber in the liquid discharge head. Therefore, the inventors have newly found that the temperature of the ink in the pressure chamber is acquired by disposing resistance wiring inside the liquid discharge head and using the correspondence relationship between the resistance value of the resistance wiring and the temperature. However, it is desired to improve the temperature detection accuracy by the resistance wiring disposed inside the liquid discharge head.

SUMMARY

According to a first aspect of the present disclosure, there is provided a liquid discharge head. The liquid discharge head includes a pressure chamber substrate that is provided with a plurality of pressure chambers, an individual electrode that is individually provided for the plurality of pressure chambers, a common electrode that is commonly provided for the plurality of pressure chambers, a piezoelectric body that is provided between the individual electrode and the common electrode for applying pressure to liquid in the pressure chambers, a drive wiring that is electrically coupled to the individual electrode and the common electrode, and applies a voltage for driving the piezoelectric body, a detection resistor that is formed of the same material as any of the individual electrode, the common electrode, and the drive wiring for detecting temperature of the liquid in the pressure chambers, and a sealing substrate that has a wall portion and a ceiling portion, and protects the piezoelectric body by the wall portion and the ceiling portion. The detection resistor is provided so that a part overlapping the wall portion is shorter than a part not overlapping the wall portion when viewed along a lamination direction of the piezoelectric body, the individual electrode, and the common electrode.

According to a second aspect of the present disclosure, there is provided a liquid discharge device. The liquid discharge device includes the liquid discharge head according to the first aspect, and a control section that controls a discharge operation of the liquid discharge head.

DESCRIPTION OF EXEMPLARY EMBODIMENTS

A. First Embodiment

Figure 1:
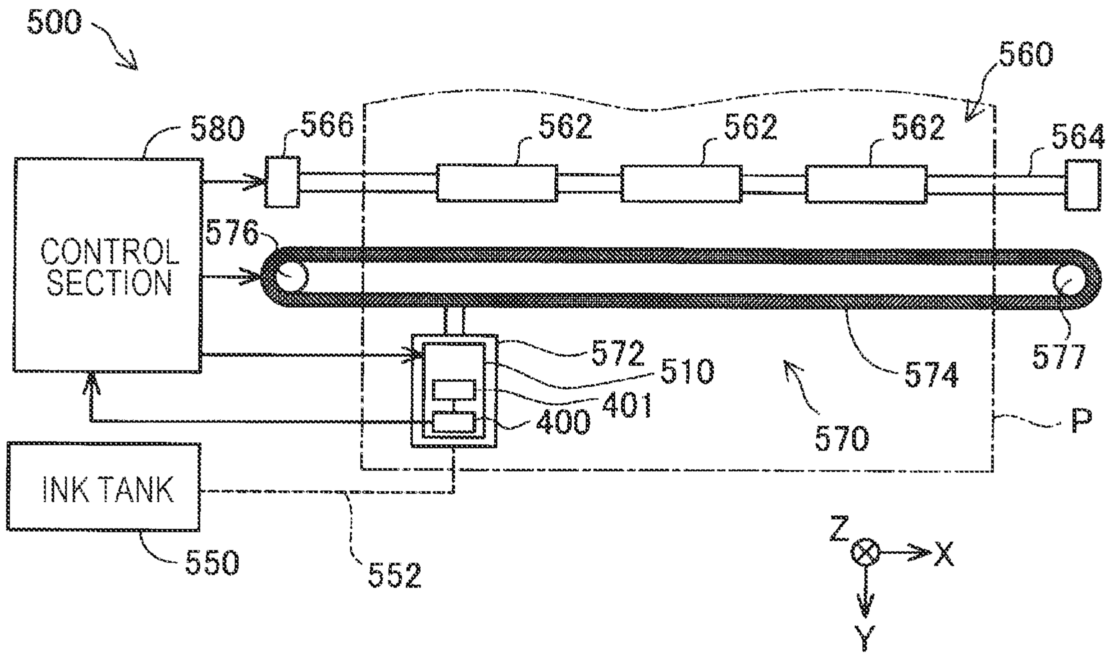
FIG. 1 is an explanatory view showing a schematic configuration of a liquid discharge device as a first embodiment of the present disclosure.

FIG. 1 is an explanatory view showing a schematic configuration of a liquid discharge device 500 as a first embodiment of the present disclosure. In the present embodiment, the liquid discharge device 500 is an ink jet printer that discharges ink as an example of a liquid onto printing paper P to form an image. The liquid discharge device 500 may use any kind of medium, such as a resin film or a cloth, as an ink discharge target, instead of the printing paper P. X, Y, and Z shown in FIG. 1 and each of the drawings subsequent to FIG. 1 represent three spatial axes orthogonal to each other. In the present specification, directions along the axes are also referred to as an X-axis direction, a Y-axis direction, and a Z-axis direction. When specifying the direction, a positive direction is "+" and a negative direction is "−" so that positive and negative signs are used together in the direction notation, and description will be performed while a direction to which an arrow faces in each of the drawings is the + direction and an opposite direction thereof is the − direction. In the present embodiment, the Z direction coincides with a vertical direction, the +Z direction indicates vertically downward, and the −Z direction indicates vertically upward. Further, when the positive direction and the negative direction are not limited, the three X, Y, and Z will be described as the X axis, the Y axis, and the Z axis.

As shown in FIG. 1, the liquid discharge device 500 includes a liquid discharge head 510, a temperature acquisition section 400, an ink tank 550, a transport mechanism

560, a moving mechanism 570, and a control section 580. The liquid discharge head 510 has a detection resistor 401. In the present embodiment, the temperature acquisition section 400 is included in the liquid discharge head 510. The liquid discharge head 510 is formed with a plurality of nozzles, discharges inks of a total of four colors, for example, black, cyan, magenta, and yellow in the +Z direction to form an image on a printing paper P. The liquid discharge head 510 is mounted on the carriage 572 and reciprocates in a main scanning direction with the movement of the carriage 572. In the present embodiment, the main scanning directions are the +X direction and the −X direction. The liquid discharge head 510 may further discharge ink of a random color such as light cyan, light magenta, or white, while not being limited to the four colors.

The ink tank 550 accommodates the ink to be discharged to the liquid discharge head 510. The ink tank 550 is coupled to the liquid discharge head 510 by a resin tube 552. The ink in the ink tank 550 is supplied to the liquid discharge head 510 via the tube 552. Instead of the ink tank 550, a bag-shaped liquid pack formed of a flexible film may be provided.

The transport mechanism 560 transports the printing paper P in a sub-scanning direction. The sub-scanning direction is a direction that intersects the X-axis direction, which is a main scanning direction, and is the +Y direction and the −Y direction in the present embodiment. The transport mechanism 560 includes a transport rod 564, on which three transport rollers 562 are mounted, and a transport motor 566 for rotatably driving the transport rod 564. When the transport motor 566 rotatably drives the transport rod 564, the printing paper P is transported in the +Y direction, which is the sub-scanning direction. The number of the transport rollers 562 is not limited to three and may be a random number. Further, a configuration, in which a plurality of transport mechanisms 560 are provided, may be provided.

The moving mechanism 570 includes a transport belt 574, a moving motor 576, and a pulley 577, in addition to the carriage 572. The carriage 572 mounts the liquid discharge head 510 in a state where the ink can be discharged. The carriage 572 is fixed to the transport belt 574. The transport belt 574 is bridged between the moving motor 576 and the pulley 577. When the moving motor 576 is rotatably driven, the transport belt 574 reciprocates in the main scanning direction. As a result, the carriage 572 fixed to the transport belt 574 also reciprocates in the main scanning direction.

The control section 580 controls the entire liquid discharge device 500. The control section 580 controls, for example, a reciprocating operation of the carriage 572 along the main scanning direction, a transport operation of the printing paper P along the sub-scanning direction, and a discharge operation of the liquid discharge head 510. The control section 580 includes, for example, one or a plurality of processing circuits such as a Central Processing Unit (CPU) or a Field Programmable Gate Array (FPGA), and one or a plurality of storage circuits such as a semiconductor memory.

Figure 2:
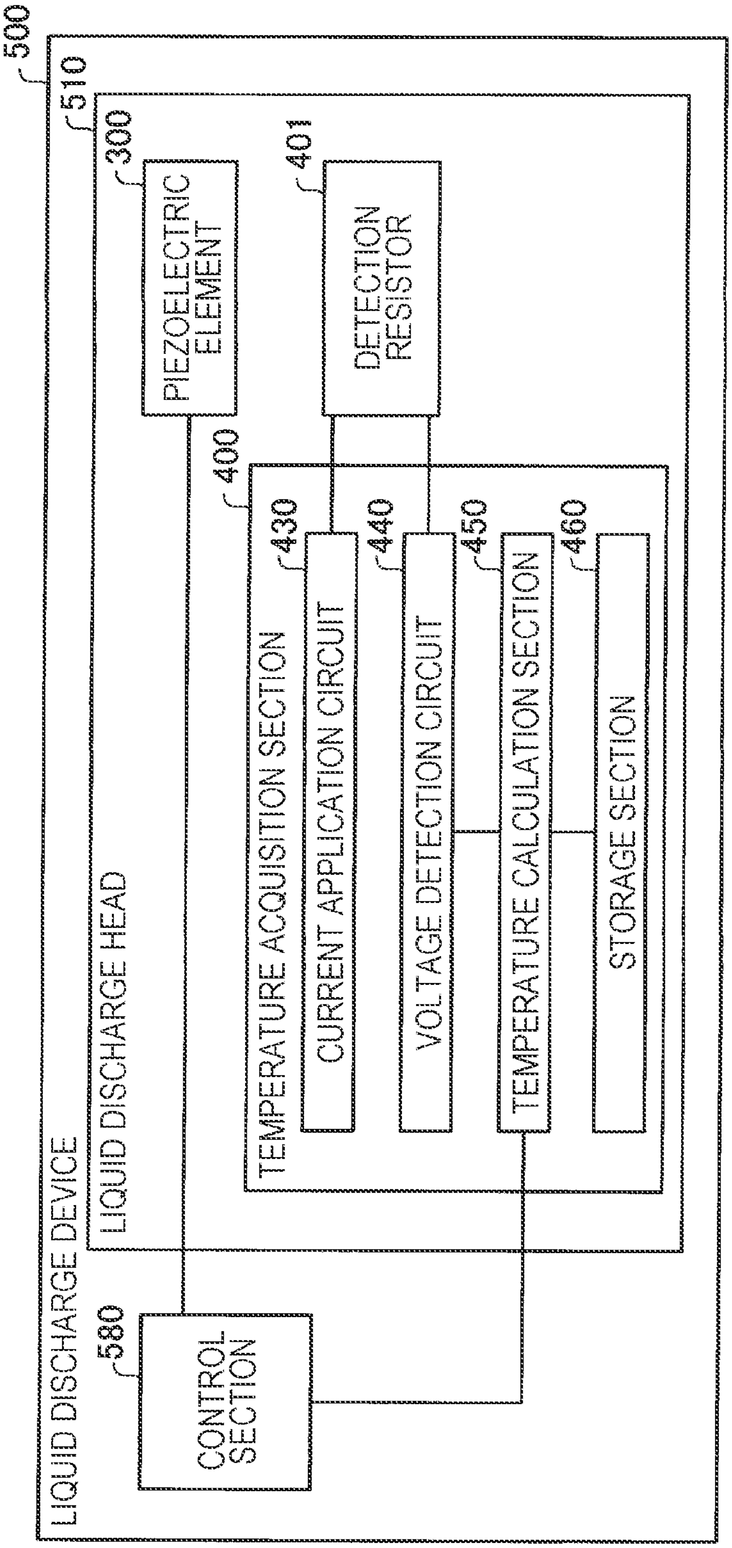
FIG. 2 is a block diagram showing a functional configuration of the liquid discharge device.

FIG. 2 is a block diagram showing a functional configuration of the liquid discharge device 500. In FIG. 2, the configurations of the ink tank 550, the transport mechanism 560, and the moving mechanism 570 are omitted. The liquid discharge head 510 of the present embodiment includes a piezoelectric element 300, a detection resistor 401, and a temperature acquisition section 400.

The piezoelectric element 300 causes a pressure change in the ink in the pressure chamber of the liquid discharge head 510. The detection resistor 401 is a resistance wiring used for detecting the temperature of the ink in the pressure chamber. The temperature acquisition section 400 estimates the temperature of the ink in the pressure chamber by detecting the temperature of the detection resistor 401 by utilizing the characteristic that the electric resistance value of the resistance wiring of metal, semiconductor, or the like changes depending on the temperature. The temperature acquisition section 400 includes a current application circuit 430, a voltage detection circuit 440, a temperature calculation section 450, and a storage section 460.

The current application circuit 430 applies a current to the detection resistor 401. In the present embodiment, the current application circuit 430 is a constant current circuit which causes a predetermined constant current to flow through the detection resistor 401. The voltage detection circuit 440 detects the voltage value of the voltage generated in the detection resistor 401 by applying the current.

As the storage section 460, for example, a non-volatile memory, such as EEPROM, which can be erased by an electric signal, a non-volatile memory, such as One-Time-PROM or EPROM, which can be erased by ultraviolet rays, and a non-volatile memory, such as PROM, which cannot be erased can be used. The storage section 460 stores various programs for realizing functions provided by the temperature acquisition section 400 in the present embodiment. The CPU of the temperature acquisition section 400 functions as the temperature calculation section 450 by executing various programs stored in the storage section 460.

The temperature calculation section 450 acquires the electric resistance value of the detection resistor 401 and calculates the temperature of the pressure chamber. Specifically, the temperature calculation section 450 acquires the resistance value of the detection resistor 401 based on the current value of the current applied to the detection resistor 401 from the current application circuit 430 and the voltage value of the voltage generated in the detection resistor 401 by applying the current. The temperature calculation section 450 calculates the temperature of the pressure chamber by using the acquired resistance value of the detection resistor 401 and a temperature calculation formula stored in the storage section 460. The temperature calculation formula shows the correspondence relationship between the electric resistance value of the detection resistor 401 and the temperature.

The temperature acquisition section 400 outputs the detected temperature of the pressure chamber to the control section 580. The control section 580 controls the discharge of the ink to the printing paper P by outputting a drive signal based on the temperature of the pressure chamber acquired from the temperature acquisition section 400 to the liquid discharge head 510 to drive the piezoelectric element 300.

Figure 3:
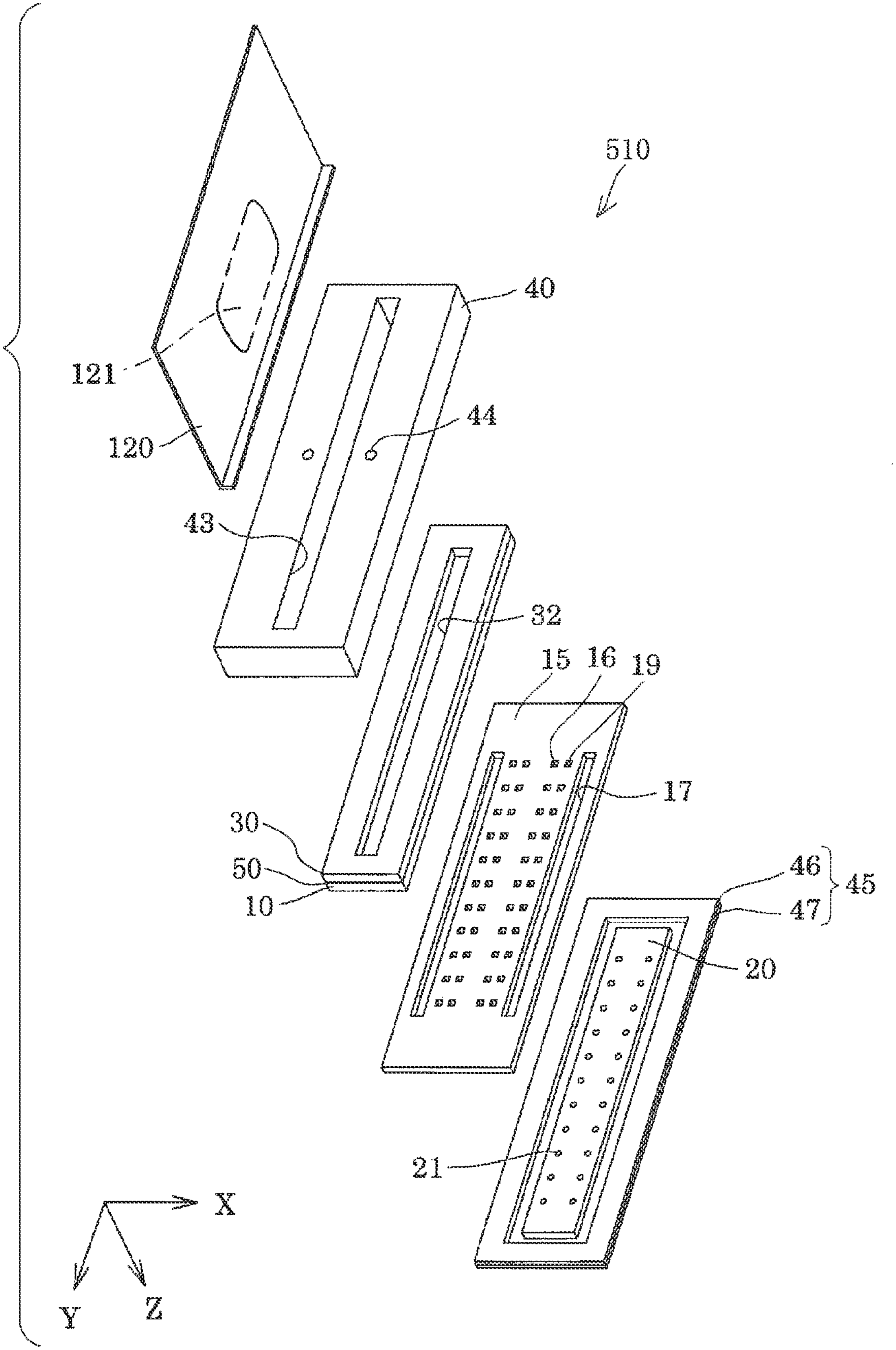
FIG. 3 is an exploded perspective view showing a configuration of a liquid discharge head.
Figure 4:
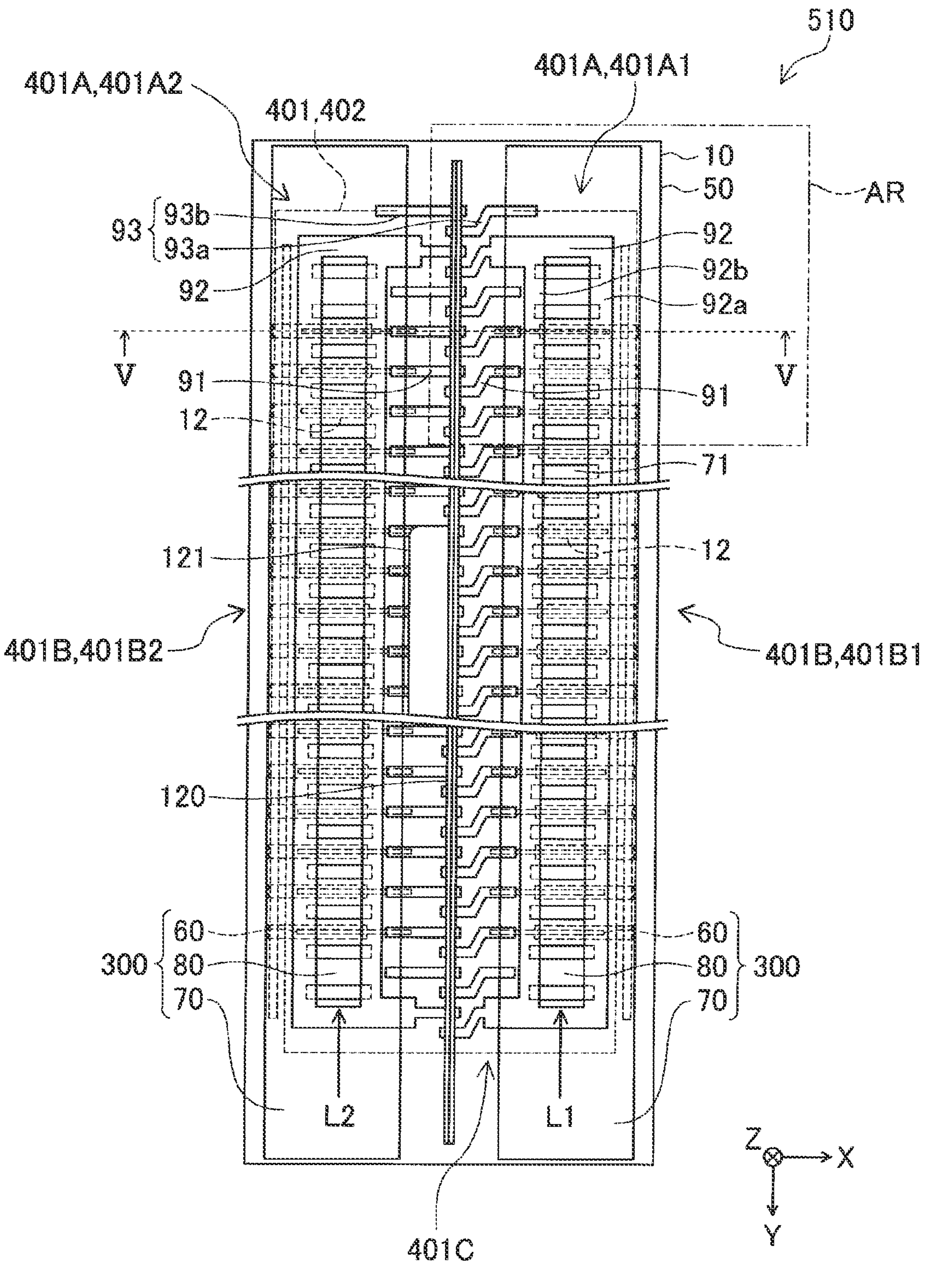
FIG. 4 is an explanatory view showing a configuration of the liquid discharge head in a plan view.
Figure 5:
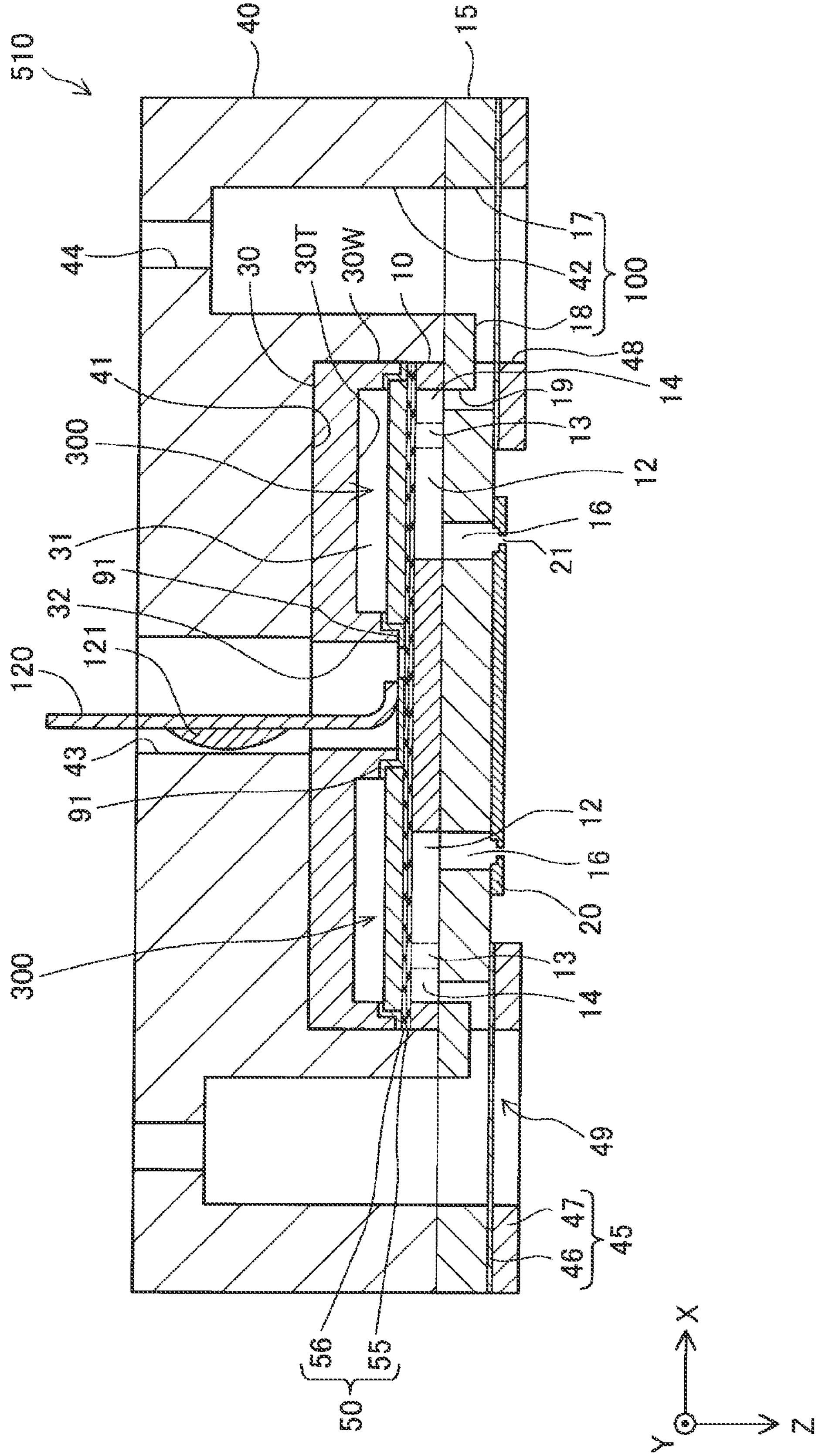
FIG. 5 is a cross-sectional view showing a V-V position of FIG. 4.

A detailed configuration of the liquid discharge head 510 will be described with reference to FIGS. 3 to 5. FIG. 3 is an exploded perspective view showing the configuration of the liquid discharge head 510. FIG. 4 is an explanatory view showing the configuration of the liquid discharge head 510 in a plan view. FIG. 4 shows a configuration in the vicinity of a pressure chamber substrate 10 in the liquid discharge head 510. In FIG. 4, a sealing substrate 30 and a case member 40 are not shown in the drawing for easy understanding of the technique. FIG. 5 is a cross-sectional view showing a V-V position of FIG. 4.

As shown in FIG. 3, the liquid discharge head 510 includes a pressure chamber substrate 10, a communication plate 15, a nozzle plate 20, a compliance substrate 45, a sealing substrate 30, a case member 40, a diaphragm 50, and a relay substrate 120, and further includes a piezoelectric element 300 shown in FIG. 4. The pressure chamber substrate 10, the communication plate 15, the nozzle plate 20, the compliance substrate 45, the diaphragm 50, the piezoelectric element 300, the sealing substrate 30, and the case member 40 are laminated members, and the liquid discharge head 510 is formed by laminating the laminated members. In the present disclosure, a direction in which the laminated members forming the liquid discharge head 510 are laminated is also referred to as a "lamination direction". In the present embodiment, the lamination direction coincides with the Z-axis direction.

The pressure chamber substrate 10 is formed by using, for example, a silicon substrate, a glass substrate, an SOI substrate, various ceramic substrates, and the like. As shown in FIG. 4, a plurality of pressure chambers 12 are arranged in the pressure chamber substrate 10 along a predetermined direction in the pressure chamber substrate 10. The direction in which the plurality of pressure chambers 12 are arranged is also referred to as an "arrangement direction". The pressure chamber 12 is formed in a substantially rectangular shape in which a length in the X-axis direction is longer than a length in the Y-axis direction in a plan view. In the present disclosure, the "plan view" means a state in which an object is viewed along the lamination direction. The shape of the pressure chamber 12 is not limited to the rectangular shape, and may be a parallelogram shape, a polygonal shape, a circular shape, an oval shape, or the like. The oval shape means a shape in which both end portions in a longitudinal direction are semicircular based on a rectangular shape, and includes a rounded rectangular shape, an elliptical shape, an egg shape, and the like.

In the present embodiment, the plurality of pressure chambers 12 are arranged in two rows each having the Y-axis direction as the arrangement direction. In the example of FIG. 4, the pressure chamber substrate 10 is formed with two pressure chamber rows, that is, a first pressure chamber row L1 having the Y-axis direction as the arrangement direction and a second pressure chamber row L2 having the Y-axis direction as the arrangement direction. The first pressure chamber row L1 and the second pressure chamber row L2 are disposed on both sides while sandwiching the relay substrate 120. Specifically, the second pressure chamber row L2 is disposed on the opposite side of the first pressure chamber row L1 sandwiching the relay substrate 120 in the direction that intersects the arrangement direction of the first pressure chamber row L1. The direction orthogonal to both the arrangement direction and the lamination direction is also referred to as an "intersection direction". In the example of FIG. 4, the intersection direction is the X-axis direction, and the second pressure chamber row L2 is disposed in the −X direction with respect to the first pressure chamber row L1 while sandwiching the relay substrate 120. The plurality of pressure chambers 12 do not necessarily have to be arranged in a straight line, and, for example, the plurality of pressure chambers 12 may be arranged along the Y-axis direction according to so-called staggered arrangement to be alternately disposed in the intersection direction.

The plurality of pressure chambers 12 belonging to the first pressure chamber row L1 and the plurality of pressure chambers 12 belonging to the second pressure chamber row L2 have positions which are respectively coincide with each other in the arrangement direction, and are disposed to be adjacent to each other in the intersection direction.

As shown in FIG. 3, the communication plate 15, the nozzle plate 20, and the compliance substrate 45 are laminated on the +Z direction side of the pressure chamber substrate 10. The communication plate 15 is, for example, a flat plate member using a silicon substrate, a glass substrate, an SOI substrate, various ceramic substrates, a metal substrate, or the like. Examples of the metal substrate include a stainless steel substrate or the like. As shown in FIG. 5, the communication plate 15 is provided with a nozzle communication path 16, a first manifold portion 17, a second manifold portion 18, and a supply communication path 19. It is preferable that the communication plate 15 is formed by using a material having a thermal expansion coefficient substantially the same as a thermal expansion coefficient of the pressure chamber substrate 10. As a result, when the temperatures of the pressure chamber substrate 10 and the communication plate 15 change, it is possible to suppress the warp of the pressure chamber substrate 10 and the communication plate 15 due to a difference in the thermal expansion coefficient.

As shown in FIG. 5, the nozzle communication path 16 is a flow path that communicates the pressure chamber 12 and a nozzle 21. The first manifold portion 17 and the second manifold portion 18 function as a part of a manifold 100 which is a common liquid chamber in which a plurality of pressure chambers 12 communicate with each other. The first manifold portion 17 is provided to penetrate the communication plate 15 in the Z-axis direction. Further, as shown in FIG. 5, the second manifold portion 18 is provided on a surface of the communication plate 15 on the +Z direction side without penetrating the communication plate 15 in the Z-axis direction.

As shown in FIG. 5, the supply communication path 19 is a flow path coupled to a pressure chamber supply path 14 provided on the pressure chamber substrate 10. The pressure chamber supply path 14 is a flow path coupled to one end portion of the pressure chamber 12 in the X-axis direction via a throttle portion 13. The throttle portion 13 is a flow path provided between the pressure chamber 12 and the pressure chamber supply path 14. The throttle portion 13 is a flow path in which an inner wall protrudes from the pressure chamber 12 and the pressure chamber supply path 14 and which is formed narrower than the pressure chamber 12 and the pressure chamber supply path 14. As a result, the throttle portion 13 is set so that the flow path resistance is higher than those of the pressure chamber 12 and the pressure chamber supply path 14. According to the liquid discharge head 510 configured in this way, even when pressure is applied to the pressure chamber 12 by the piezoelectric element 300 when the ink is discharged, it is possible to reduce or prevent the ink in the pressure chamber 12 from flowing back to the pressure chamber supply path 14. A plurality of supply communication paths 19 are arranged along the Y-axis direction, that is, the arrangement direction, and are individually provided for the respective pressure chambers 12. The supply communication path 19 and the pressure chamber supply path 14 communicates the second manifold portion 18 with each pressure chamber 12, and supplies the ink in the manifold 100 to each pressure chamber 12.

The nozzle plate 20 is provided on a side opposite to the pressure chamber substrate 10, that is, on a surface of the communication plate 15 on the +Z direction side while sandwiching the communication plate 15 therebetween. The material of the nozzle plate 20 is not particularly limited, and, for example, a silicon substrate, a glass substrate, an SOI substrate, various ceramic substrates, and a metal substrate can be used. Examples of the metal substrate include a stainless steel substrate or the like. As the material of the nozzle plate 20, an organic substance, such as a polyimide resin, can also be used. However, it is preferable that the nozzle plate 20 uses a material substantially the same as the thermal expansion coefficient of the communication plate 15. As a result, when the temperatures of the nozzle plate 20 and the communication plate 15 change, it is possible to suppress the warp of the nozzle plate 20 and the communication plate 15 due to the difference in the thermal expansion coefficient.

A plurality of nozzles 21 are formed on the nozzle plate 20. Each nozzle 21 communicates with each pressure chamber 12 via the nozzle communication path 16. As shown in FIG. 3, the plurality of nozzles 21 are arranged along the arrangement direction of the pressure chamber 12, that is, the Y-axis direction. The nozzle plate 20 is provided with two nozzle rows in which the plurality of nozzles 21 are arranged in a row. The two nozzle rows are provided to correspond to the first pressure chamber row L1 and the second pressure chamber row L2, respectively.

As shown in FIG. 5, the compliance substrate 45 is provided together with the nozzle plate 20 on the side opposite to the pressure chamber substrate 10 while sandwiching the communication plate 15 therebetween, that is, on a surface of the communication plate 15 on the +Z direction side. The compliance substrate 45 is provided around the nozzle plate 20 and covers openings of the first manifold portion 17 and the second manifold portion 18 provided in the communication plate 15. In the present embodiment, the compliance substrate 45 includes a sealing film 46 made of a flexible thin film and a fixed substrate 47 made of a hard material such as metal. As shown in FIG. 5, a region of the fixed substrate 47, which faces the manifold 100, is an opening portion 48 completely removed in a thickness direction. Therefore, one surface of the manifold 100 is a compliance portion 49 sealed only by the sealing film 46.

As shown in FIG. 5, the diaphragm 50 and the piezoelectric element 300 are laminated on a side opposite to the nozzle plate 20 or the like, that is, on a surface of the pressure chamber substrate 10 on the −Z direction side while sandwiching the pressure chamber substrate 10 therebetween. The piezoelectric element 300 bends and deforms the diaphragm 50 to cause a pressure change in the ink in the pressure chamber 12. In FIG. 5, a configuration of the piezoelectric element 300 is simplified and shown for easy understanding of the technique. The diaphragm 50 is provided on the +Z direction side of the piezoelectric element 300, and the pressure chamber substrate 10 is provided on the +Z direction side of the diaphragm 50.

As shown in FIG. 5, the sealing substrate 30 having substantially the same size as the pressure chamber substrate 10 in a plan view is further bonded to the surface of the pressure chamber substrate 10 on the −Z direction side by an adhesive 39 which will be described later. The sealing substrate 30 includes a ceiling portion 30T, a wall portion 30W, a holding portion 31, and a through hole 32. The holding portion 31 is a concave space defined by the ceiling portion 30T and the wall portion 30W, and protects the active portion of the piezoelectric element 300. The holding portion 31 of the sealing substrate 30 is provided for each row of the piezoelectric elements 300 arranged along the arrangement direction, and, in the present embodiment, two holding portions 31 are formed to be arranged adjacent to each other in the X-axis direction. Further, the through hole 32 extends between the two holding portions 31 along the Y-axis direction and penetrates the sealing substrate 30 along the Z-axis direction.

As shown in FIG. 5, the case member 40 is fixed on the sealing substrate 30. The case member 40 forms the manifold 100 that communicates with the plurality of pressure chambers 12, together with the communication plate 15. The case member 40 has substantially the same outer shape as the communication plate 15 in a plan view, and is bonded to cover the sealing substrate 30 and the communication plate 15.

The case member 40 has an accommodation section 41, a supply port 44, a third manifold portion 42, and a coupling port 43. The accommodation section 41 is a space having a depth capable of accommodating the pressure chamber substrate 10 and the sealing substrate 30. The third manifold portion 42 is a space formed on both outer sides of the accommodation section 41 in the X-axis direction in the case member 40. The manifold 100 is formed by coupling the third manifold portion 42 to the first manifold portion 17 and the second manifold portion 18 provided in the communication plate 15. The manifold 100 has a long shape that is continuous over the Y-axis direction. The supply port 44 communicates with the manifold 100 to supply ink to each manifold 100. The coupling port 43 is a through hole that communicates with the through hole 32 of the sealing substrate 30, and a relay substrate 120 is inserted thereto.

In the liquid discharge head 510 of the present embodiment, the ink supplied from the ink tank 550 shown in FIG. 1 is taken from the supply port 44 shown in FIG. 5, and an internal flow path from the manifold 100 to the nozzle 21 is filled with ink. After that, a voltage based on the drive signal is applied to each of the piezoelectric elements 300 corresponding to the plurality of pressure chambers 12. As a result, the diaphragm 50 bends and deforms together with the piezoelectric element 300, the pressure in each pressure chamber 12 increases, and ink droplets are discharged from each nozzle 21.

Figure 6:
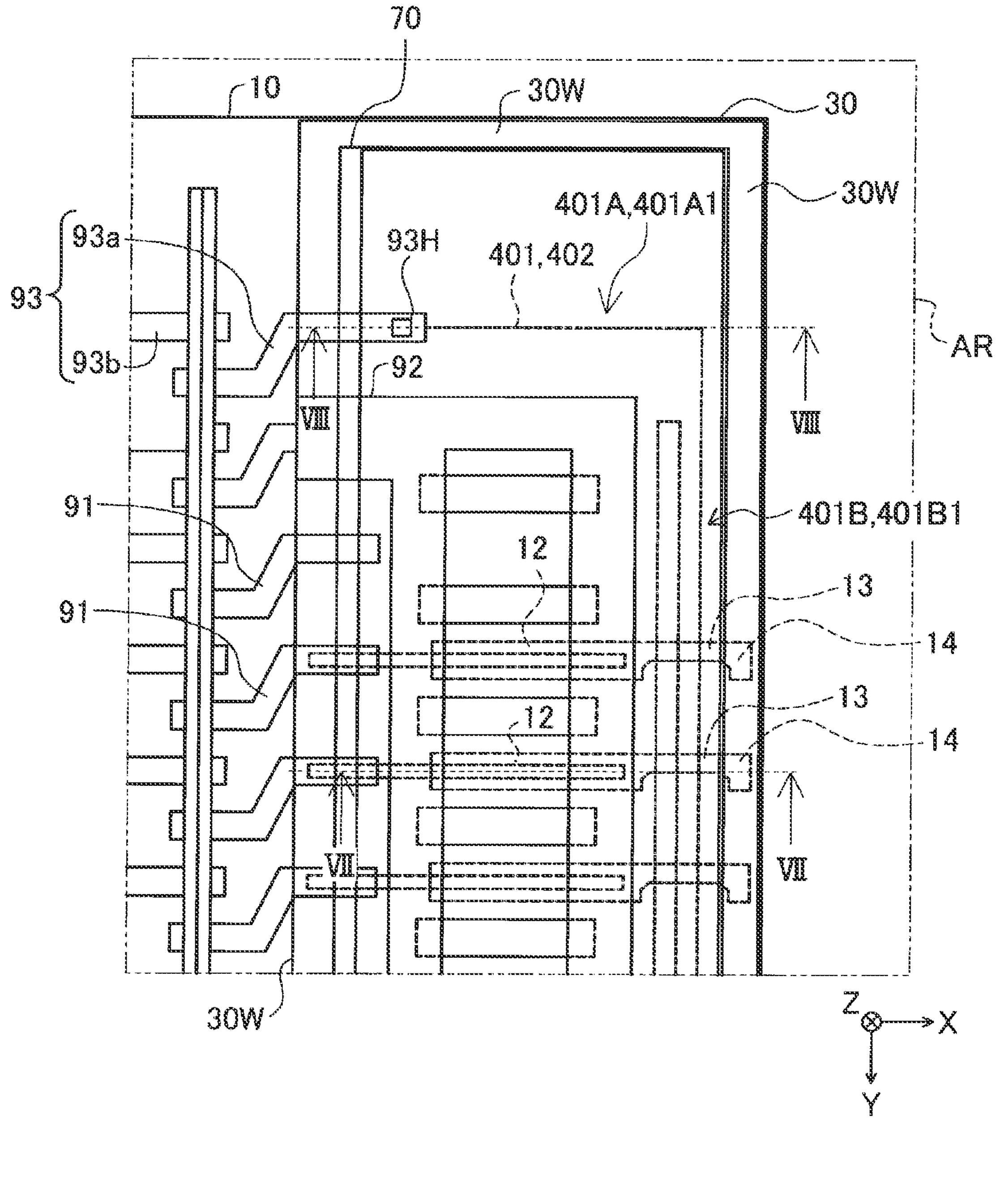
FIG. 6 is an enlarged cross-sectional view showing a partial range of FIG. 4.
Figure 7:
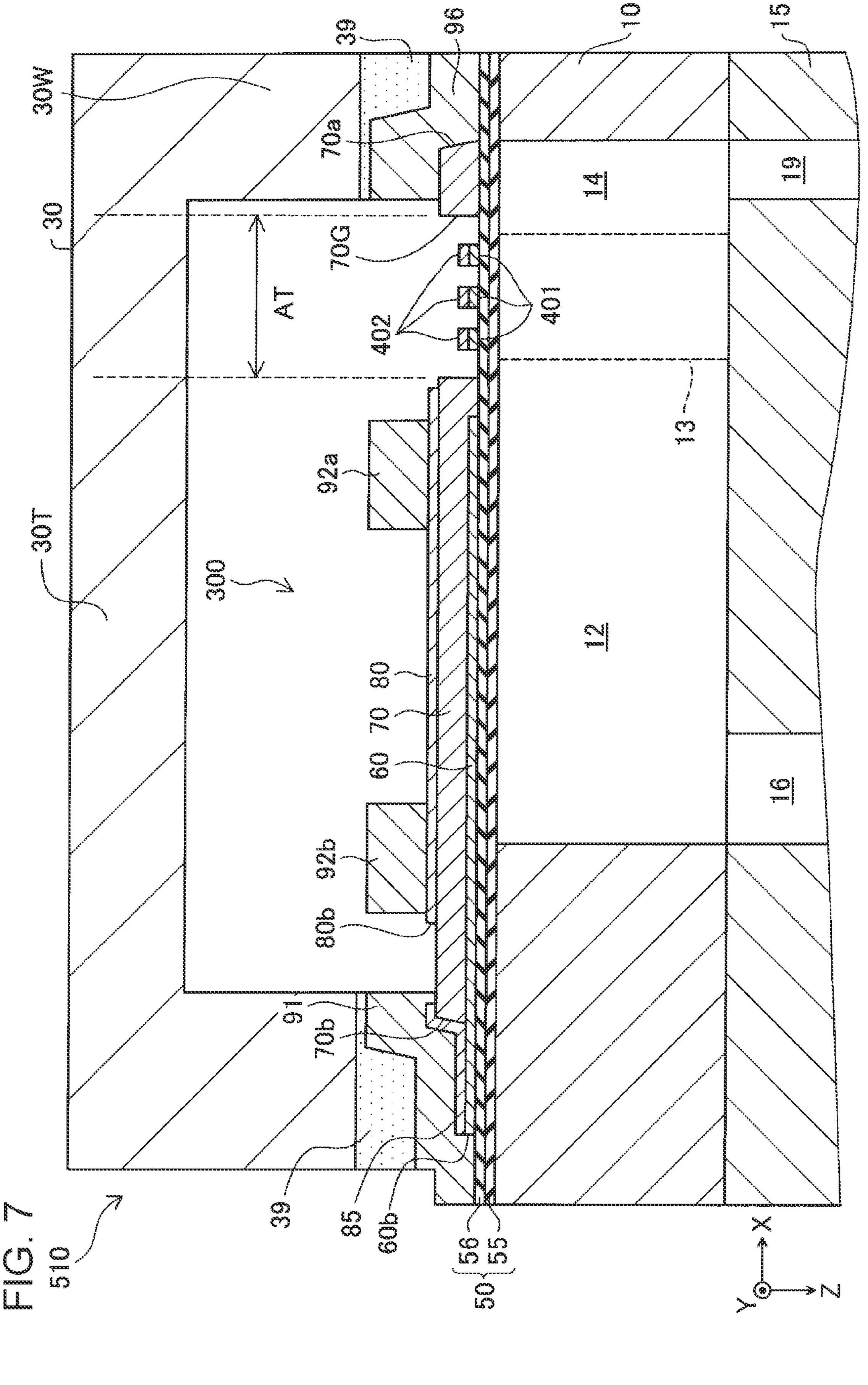
FIG. 7 is a cross-sectional view showing a VII-VII position of FIG. 6.
Figure 8:
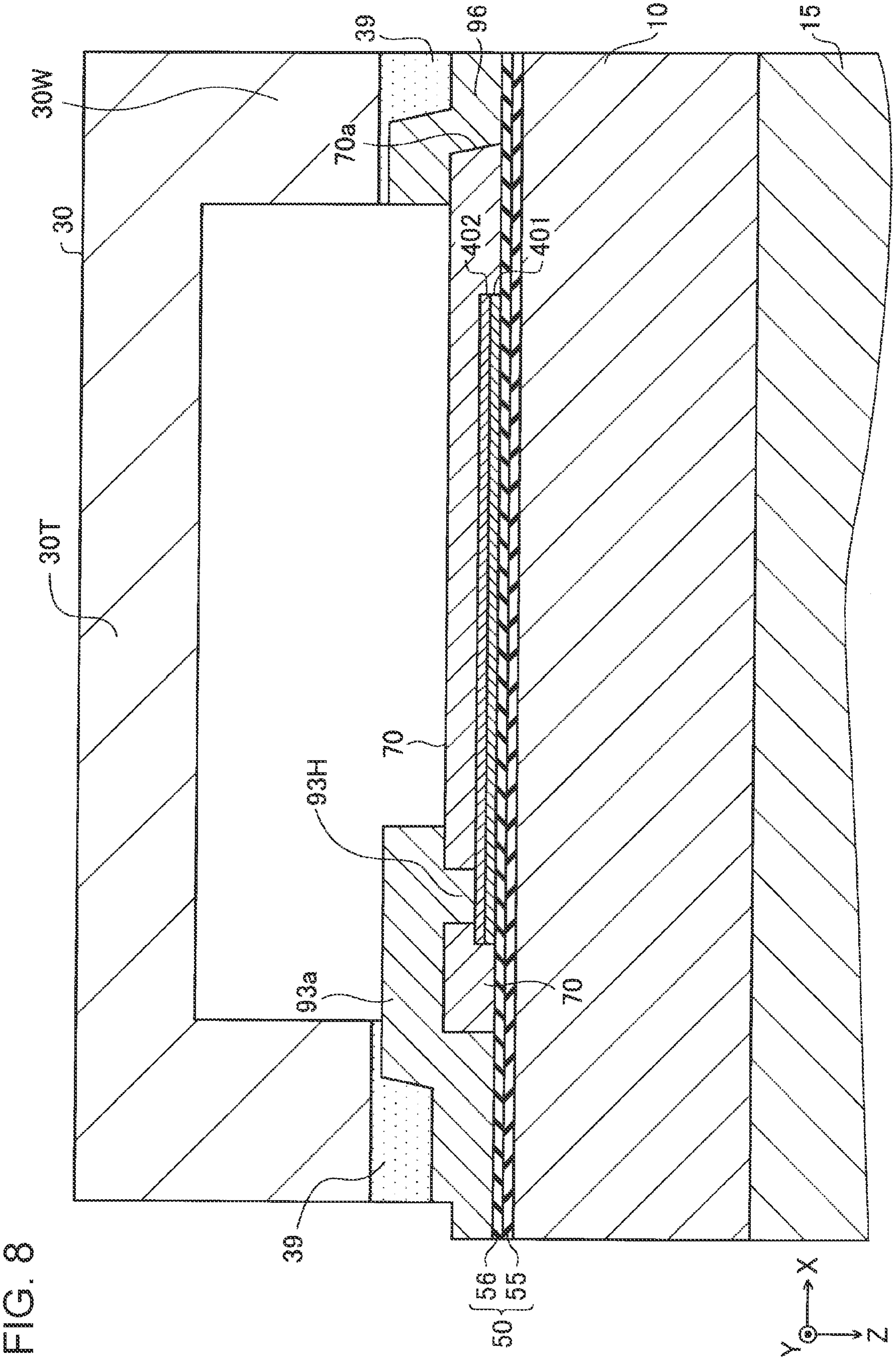
FIG. 8 is a cross-sectional view showing a VIII-VIII position of FIG. 6.

The configurations of the piezoelectric element 300 and the detection resistor 401 will be described with reference to FIGS. 6 to 8 together with FIGS. 4 and 5. FIG. 6 is an enlarged cross-sectional view showing the range AR of FIG. 4. FIG. 7 is a cross-sectional view showing a VII-VII position of FIG. 6. FIG. 8 is a cross-sectional view showing a VIII-VIII position of FIG. 6. As shown in FIG. 6, the liquid discharge head 510 further has an individual lead electrode 91, a common lead electrode 92, a measurement lead electrode 93, and a detection resistor 401, in addition to the diaphragm 50 and the piezoelectric element 300 on the −Z direction side of the pressure chamber substrate 10.

As shown in FIG. 7, the diaphragm 50 has an elastic film 55 provided on the pressure chamber substrate 10 side and formed of silicon oxide ($SiO_2$), and an insulator film 56 provided on the elastic film 55 and formed of a zirconium oxide film (ZrO2). The flow path formed in the pressure chamber substrate 10 such as the pressure chamber 12 is formed by anisotropically etching the pressure chamber substrate 10 from the surface on the +Z direction side. The elastic film 55 constitutes a surface of the flow path, such as the pressure chamber 12, on the −Z direction side. In addition, the diaphragm 50 may be composed of, for example, either the elastic film 55 or the insulator film 56, and may further include another film other than the elastic film 55 and the insulator film 56. Examples of the material of the other film include silicon, silicon nitride, and the like.

The piezoelectric element 300 applies pressure to the pressure chamber 12. As shown in FIG. 7, the piezoelectric element 300 has a first electrode 60, a piezoelectric body 70, and a second electrode 80. As shown in FIG. 7, the first electrode 60, the piezoelectric body 70, and the second electrode 80 are laminated in order from the +Z direction side to the −Z direction side along the lamination direction. The piezoelectric body 70 is provided between the first electrode 60 and the second electrode 80 in the lamination direction in which the first electrode 60, the second electrode 80, and the piezoelectric body 70 are laminated.

Both the first electrode 60 and the second electrode 80 are electrically coupled to the relay substrate 120 shown in FIG. 5. The first electrode 60 and the second electrode 80 apply a voltage corresponding to the drive signal to the piezoelectric body 70. When a voltage is applied between the first electrode 60 and the second electrode 80, a part, at which piezoelectric distortion occurs in the piezoelectric body 70, in the piezoelectric element 300 is also referred to as an active portion. In the piezoelectric element 300, the active portion is a part in which the piezoelectric body 70 is sandwiched between the first electrode 60 and the second electrode 80.

A different drive voltage is supplied to the first electrode 60 according to the discharge amount of ink, and a constant reference voltage signal is supplied to the second electrode 80 regardless of the discharge amount of ink. When the active portion of the piezoelectric element 300 is driven and a potential difference is generated between the first electrode 60 and the second electrode 80, the piezoelectric body 70 is deformed. When the piezoelectric element 300 is driven, a part which actually displaces in the Z-axis direction is also called a flexible portion. In the piezoelectric element 300, a part facing the pressure chamber 12 in the Z-axis direction is the flexible portion. Due to the deformation of the piezoelectric body 70, the diaphragm 50 is deformed or vibrated, so that the volume of the pressure chamber 12 changes. Due to the change in the volume of the pressure chamber 12, pressure is applied to the ink accommodated in the pressure chamber 12, and the ink is discharged from the nozzle 21 via the nozzle communication path 16.

The first electrode 60 is an individual electrode that is individually provided for the plurality of pressure chambers 12. As shown in FIG. 7, the first electrode 60 is a lower electrode provided on an opposite side of the second electrode 80 while sandwiching the piezoelectric body 70 therebetween, that is, on the +Z direction side of the piezoelectric body 70, and is provided below the piezoelectric body 70. The thickness of the first electrode 60 is formed to be, for example, approximately 80 nanometers. For example, the first electrode 60 is formed of a conductive material including a metal, such as platinum (Pt), iridium (Ir), gold (Au), titanium (Ti), and a conductive metal oxide such as indium tin oxide abbreviated as ITO. The first electrode 60 may be formed by laminating a plurality of materials such as platinum (Pt), iridium (Ir), gold (Au), and titanium (Ti). In the present embodiment, platinum (Pt) is used as the first electrode 60.

As shown in FIG. 4, the piezoelectric body 70 has a predetermined width in the X-axis direction, and is provided to extend along the arrangement direction of the pressure chambers 12, that is, the Y-axis direction. As shown in FIG. 7, the end portion 70*a* of the piezoelectric body 70 in the +X direction is covered with a wiring portion 96 simultaneously formed with the individual lead electrodes 91. An adhesive 39 for adhering the wall portion 30W of the sealing substrate 30 is arranged above the wiring portion 96. In addition, the wiring portion 96 can be omitted.

The thickness of the piezoelectric body 70 is formed, for example, from approximately 1000 nanometers to 4000 nanometers. Examples of the piezoelectric body 70 include a crystal film having a perovskite structure formed on the first electrode 60 and made of a ferroelectric ceramic material exhibiting an electromechanical conversion action, that is, a so-called perovskite type crystal. As the material of the piezoelectric body 70, for example, a ferroelectric piezoelectric material such as lead zirconate titanate (PZT) or a material to which a metal oxide, such as niobium oxide, nickel oxide, or magnesium oxide, is added is used. Specifically, lead titanate (PbTiO3), lead zirconate titanate (Pb (Zr,Ti) O3), lead zirconate (PbZrO3), lead lanthanum titanate ((Pb,La),TiO3), lead lanthanum zirconate titanate ((Pb, La)(Zr,Ti)O3), lead magnesium niobate zirconate (Pb (Zr, Ti) (Mg,Nb)O3), or the like can be used. In the present embodiment, lead zirconate titanate (PZT) is used as the piezoelectric body 70.

The material of the piezoelectric body 70 is not limited to the lead-based piezoelectric material containing lead, and a non-lead-based piezoelectric material containing no lead can also be used. Examples of the non-lead-based piezoelectric material include bismuth iron acid ((BiFeO3), abbreviated as "BFO"), barium titanate ((BaTiO3), abbreviated as "BT"), potassium sodium niobate ((K,Na) (NbO3), abbreviated as "KNN"), potassium sodium lithium niobate ((K, Na,Li) (NbO3)), potassium sodium lithium tantalate niobate ((K,Na,Li) (Nb,Ta)O3), bismuth potassium titanate ((Bi1/2K1/2) TiO3, abbreviated as "BKT"), bismuth sodium titanate ((Bi1/2Na1/2) TiO3, abbreviated as "BNT"), bismuth manganate (BimnO3, abbreviated as "BM"), composite oxide containing bismuth, potassium, titanium and iron and having a perovskite structure (x[(BixK1-x)TiO3]-(1-x) [BiFeO3], abbreviated as "BKT-BF"), composite oxide containing bismuth, iron, barium and titanium and having a perovskite structure ((1-x)[BiFeO3]-x[BaTiO3], abbreviated as "BFO-BT"), and a material ((1-x)[Bi(Fe1-yMy)O3]-x[BaTiO3] (M is Mn, Co or Cr)), which is obtained by adding metals, such as manganese, cobalt, and chromium, to the composite oxide.

As shown in FIG. 4, the second electrode 80 is a common electrode that is commonly provided with respect to the plurality of pressure chambers 12. The second electrode 80 has a predetermined width in the X-axis direction, and is provided to extend along the arrangement direction of the pressure chambers 12, that is, the Y-axis direction. As shown in FIG. 7, the second electrode 80 is an upper electrode provided above the piezoelectric body 70 on an opposite side of the first electrode 60 while sandwiching the piezoelectric body 70 therebetween, that is, on the −Z direction side of the piezoelectric body 70. The material of the second electrode 80 is not particularly limited, but, similar to the first electrode 60, for example, metals, such as platinum (Pt), iridium (Ir), gold (Au), and titanium (Ti), and conductive materials including conductive metal oxides, such as indium tin oxide abbreviated as ITO, are used. Alternatively, a plurality of materials such as platinum (Pt), iridium (Ir), gold (Au), and titanium (Ti) may be laminated and formed. In the present embodiment, iridium (Ir) is used as the second electrode 80.

As shown in FIG. 7, a wiring portion 85 is provided on the −X direction side rather than the end portion 80*b* of the second electrode 80 in the −X direction. The wiring portion 85 is in the same layer as the second electrode 80, but is electrically discontinuous with the second electrode 80. The wiring portion 85 is formed from the end portion 70*b* of the piezoelectric body 70 in the −X direction to the end portion 60*b* of the first electrode 60 in the −X direction in a state of being spaced from the end portion 80*b* of the second electrode 80. The end portion 60*b* of the first electrode 60 in the −X direction is pulled out from the end portion 70*b* of the piezoelectric body 70 to the outside. The wiring portion 85 is provided for each piezoelectric element 300, and a plurality of wiring portions 85 are disposed at predetermined intervals along the Y-axis direction. It is preferable that the wiring portion 85 is formed in the same layer as the second electrode 80. As a result, the cost can be reduced by simplifying a manufacturing process of the wiring portion 85. However, the wiring portion 85 may be formed in a layer different from the layer of the second electrode 80.

As shown in FIGS. 6 and 7, the individual lead electrode 91 is electrically coupled to the first electrode 60 which is an individual electrode, and an extension portion 92*a* and an extension portion 92*b* of the common lead electrode 92 is electrically coupled to the second electrode 80 which is a common electrode. The individual lead electrode 91 and the common lead electrode 92 function as drive wirings for applying a voltage for driving the piezoelectric body 70 to the piezoelectric body 70. In the present embodiment, a power supply circuit for supplying electric power to the piezoelectric body 70 via the drive wiring and the current application circuit 430 for supplying electric power to the detection resistor 401 are different circuits from each other.

The materials of the individual lead electrode 91 and the common lead electrode 92 are conductive materials. For example, gold (Au), copper (Cu), titanium (Ti), tungsten (W), nickel (Ni), chromium (Cr), platinum (Pt), aluminum (Al), and the like can be used. In the present embodiment, gold (Au) is used as the individual lead electrode 91 and the common lead electrode 92. Further, the individual lead electrode 91 and the common lead electrode 92 may have an adhesion layer for improving the adhesion with the first electrode 60, the second electrode 80, and the diaphragm 50.

The individual lead electrode 91 and the common lead electrode 92 are formed in the same layer so as to be electrically discontinuous. As a result, as compared with when the individual lead electrode 91 and the common lead electrode 92 are individually formed, the cost can be reduced by simplifying the manufacturing process. The individual lead electrode 91 and the common lead electrode 92 may be formed in different layers.

As shown in FIG. 6, the individual lead electrode 91 is provided for each first electrode 60. As shown in FIG. 7, the individual lead electrode 91 is coupled to the vicinity of the end portion 60*b* of the first electrode 60 via the wiring portion 85, and is pulled out in the −X direction to a top of the diaphragm 50. The individual lead electrode 91 is electrically coupled to the end portion 60*b* of the first electrode 60, which is pulled out from the end portion 70*b* of the piezoelectric body 70 to the outside, in the −X direction. The wiring portion 85 may be omitted, and the individual lead electrode 91 may be directly coupled to the end portion 60*b* of the first electrode 60.

As shown in FIG. 4, the common lead electrode 92 extends along the Y-axis direction, bends at both ends in the Y-axis direction, and is pulled out in the −X direction. The common lead electrode 92 has an extension portion 92*a* extending along the Y-axis direction and an extension portion 92*b*. As shown in FIGS. 4 and 5, one end portions of the individual lead electrode 91 and the common lead electrode 92 are extended to be exposed in the through hole 32 formed in the sealing substrate 30, and are electrically coupled to the relay substrate 120 in the through hole 32.

The relay substrate 120 is composed of, for example, a Flexible Printed Circuit (FPC). The relay substrate 120 is formed with a plurality of wirings for being coupled to the control section 580 and a power supply circuit (not shown). In addition, the relay substrate 120 may be composed of any flexible substrate, such as Flexible Flat Cable (FFC), instead of FPC. An integrated circuit 121 having a switching element is mounted at the relay substrate 120. A signal for driving the piezoelectric element 300 is input to the integrated circuit 121. The integrated circuit 121 controls a timing at which the signal for driving the piezoelectric element 300 is supplied to the first electrode 60 based on the input signal. As a result, the timing at which the piezoelectric element 300 is driven and the drive amount of the piezoelectric element 300 are controlled.

FIGS. 4 and 6 show a measurement lead electrode 93. The measurement lead electrode 93 is electrically coupled to the detection resistor 401. In the present embodiment, the measurement lead electrode 93 is formed in the same layer as the individual lead electrode 91 and the common lead electrode 92, and is formed to be electrically discontinuous from each other. The detection resistor 401 is electrically coupled to the relay substrate 120 by the measurement lead electrode 93. Therefore, the temperature calculation section 450 can detect the electric resistance value of the detection resistor 401.

The material of the measurement lead electrode 93 is a conductive material, and includes, for example, gold (Au), copper (Cu), titanium (Ti), tungsten (W), nickel (Ni), chromium (Cr), platinum (Pt), aluminum (Al), and the like. In the present embodiment, gold (Au) having an electric resistance value smaller than that of platinum (Pt) as the detection resistor 401 which will be described later is used for the measurement lead electrode 93. In addition, the material of the measurement lead electrode 93 is the same as the materials of the individual lead electrode 91 and the common lead electrode 92. Any material other than gold (Au) may be used for the measurement lead electrode 93, and the material may be different from those of the individual lead electrode 91 and the common lead electrode 92.

As shown in FIG. 8, the measurement lead electrode 93 includes wiring portions 93*a* and 93*b* that are extending above the piezoelectric body 70, and the contact hole 93H that is provided in the through hole 70H penetrating the piezoelectric body 70. The through hole 70H can be formed when the piezoelectric body 70 is formed by, for example, ion milling at the time of forming the piezoelectric body 70. A wiring portion 93*a* is electrically coupled to the detection resistor 401 via the contact hole 93H. Although not shown, similarly, a wiring portion 93*b* is also electrically coupled to the detection resistor 401 via the contact hole 93H. The contact hole 93H may be provided in only any of the wiring portions 93*a* and 93*b*. Further, the contact hole 93H may be omitted. In this case, for example, the detection resistor 401 may be extended so that the detection resistor 401 is exposed from the end portion 70*b* of the piezoelectric body 70, and the wiring portions 93*a* and 93*b* may be electrically coupled to the detection resistor 401 exposed from the end portion 70*b*.

As shown in FIG. 4, the detection resistor 401 is further provided on the surface of the diaphragm 50 on the −Z direction side. As shown in FIG. 4, in the present embodiment, the detection resistor 401 is continuously formed so as to surround the periphery of the first pressure chamber row L1 and the second pressure chamber row L2 in a plan view. More specifically, the detection resistor 401 has a first extending part 401A electrically coupled to the measurement lead electrode 93 which is a first wiring portion, a second extending part 401B which is continuous from the first extending part 401A, and a third extending part 401C.

The first extending part 401A extends along the X-axis direction, which is the intersection direction, at a position on one side in the arrangement direction, specifically, the −Y direction side with respect to the plurality of pressure chambers 12. In the present embodiment, the first extending part 401A includes a first extending part 401A1 coupled to the wiring portion 93*a* and a first extending part 401A2 electrically coupled to the wiring portion 93*b*. The second extending part 401B extends along the Y-axis direction, which is the arrangement direction. In the present embodiment, the second extending part 401B includes a second extending part 401B1 which is continuous with the first extending part 401A1, and a second extending part 401B2 which is continuous with the first extending part 401A2. The third extending part 401C extends along the X-axis direction, which is the intersection direction, at a position on the other side in the arrangement direction, specifically, the +Y direction side with respect to the plurality of pressure chambers 12. In the present embodiment, the third extending part 401C is continuously formed from the second extending part 401B, and electrically couples the second extending part 401B1 and the second extending part 401B2.

As shown as an example in FIGS. 6 and 7, the detection resistor 401 is disposed so as to pass in the vicinity of the ink flow path in the pressure chamber substrate 10. In the present embodiment, in the detection resistor 401, the second extending part 401B is disposed so as to pass through the −Z direction side sandwiching the diaphragm 50 with respect to the throttle portion 13 in the vicinity of each pressure chamber 12. From this, it can be considered that the second extending part 401B is a part that is more likely to contribute to the detection of the temperature of the ink in the pressure chamber 12 than the first extending part 401A and the third extending part 401C. In the example of FIG. 4, the second extending part 401B of the detection resistor 401 is formed as a so-called meandering pattern to be reciprocated a plurality of times along the arrangement direction. By configuring the second extending part 401B that easily contributes to temperature detection in this way, the temperature detection accuracy of the ink in the pressure chamber 12 by the detection resistor 401 can be improved. However, the second extending part 401B of the detection resistor 401 may be formed in a meandering pattern to be reciprocated a plurality of times along the intersection direction instead of the arrangement direction, and may be formed, for example, in any shape such as a linear shape instead of the meandering pattern.

The material of the detection resistor 401 is a material whose electric resistance value is temperature dependent. For example, gold (Au), platinum (Pt), iridium (Ir), aluminum (Al), copper (Cu), titanium (Ti), tungsten (W), nickel (Ni), chromium (Cr), and the like can be used. Here, platinum (Pt) can be preferably used as a material for the detection resistor 401 from a viewpoint that the change in electric resistance with temperature is large and stability and accuracy are high.

As shown in FIG. 7, in the present embodiment, the detection resistor 401 is in the same layer as the first electrode 60 in the lamination direction, and is formed to be electrically discontinuous with the first electrode 60. In the present embodiment, the detection resistor 401 is formed together with the first electrode 60 in a step of forming the first electrode 60. That is, the detection resistor 401 is formed of platinum (Pt), which is the same material as the first electrode 60, and the thickness of the detection resistor 401 is approximately 80 nanometers similar to the first electrode 60. However, the present disclosure is not limited thereto, and the detection resistor 401 may be individually formed separately from the first electrode 60, or may be formed in a different layer from the first electrode 60.

From the viewpoint of suppressing the decrease in the temperature detection accuracy, it is preferable to suppress heat dissipation from the detection resistor 401. As shown in FIG. 7, in the present embodiment, the low thermal conductive layer 402 is further laminated above the detection resistor 401. Specifically, the low thermal conductive layer 402 is provided on a surface opposite to the surface facing the pressure chamber substrate 10, that is, a surface on the −Z direction side in the detection resistor 401. The low thermal conductive layer 402 is a layer having a lower thermal conductivity than the detection resistor 401.

As shown in FIG. 8, from the viewpoint of facilitating the electrical coupling between the measurement lead electrode 93 and the upper portion of the detection resistor 401 via the contact hole 93H, it is preferable that the low thermal conductive layer 402 is formed of, for example, a conductive material such as metal. By providing a layer having a low thermal conductivity on the surface opposite to the surface facing the pressure chamber substrate 10 in the detection resistor 401, it is possible to suppress the heat transferred from the ink in the pressure chamber 12 to the detection resistor 401 from being dissipated from the surface opposite to the surface facing the pressure chamber substrate 10. It is preferable that the thickness of the low thermal conductive layer 402 is as thick as possible in order to more reliably suppress heat dissipation from the detection resistor 401. The low thermal conductive layer 402 does not necessarily have to be in contact with the detection resistor 401. For example, between the detection resistor 401 and the low thermal conductive layer 402, for example, an adhesion layer, such as iridium (Ir), for improving the adhesion with the detection resistor 401 and the low thermal conductive layer 402 may be disposed. The low thermal conductive layer 402 can be omitted, and in the following description, the configuration of the low thermal conductive layer 402 will be omitted unless otherwise specified.

The details of a position where the detection resistor 401 is disposed will be described with reference to FIGS. 7 and 9. FIG. 7 conceptually shows a region AT above the detection resistor 401. The region AT is a region that can cover the detection resistor 401 and the vicinity thereof. In the present embodiment, by reducing the number of members disposed in the region AT, it is possible to suppress the heat of the detection resistor 401 from being dissipated via the members disposed in the region AT. Specifically, the amount of the wiring portion 96, the adhesive 39, and the wall portion 30W of the sealing substrate 30 disposed in the region AT is set only in an overlapping part 401T which will be described later, and the number of members disposed in the region AT is set to be reduced. As a result, it is possible to suppress the heat of the detection resistor 401 from being transmitted to each of the wiring portion 96, the adhesive 39, and the wall portion 30W to be dissipated.

Figure 9:
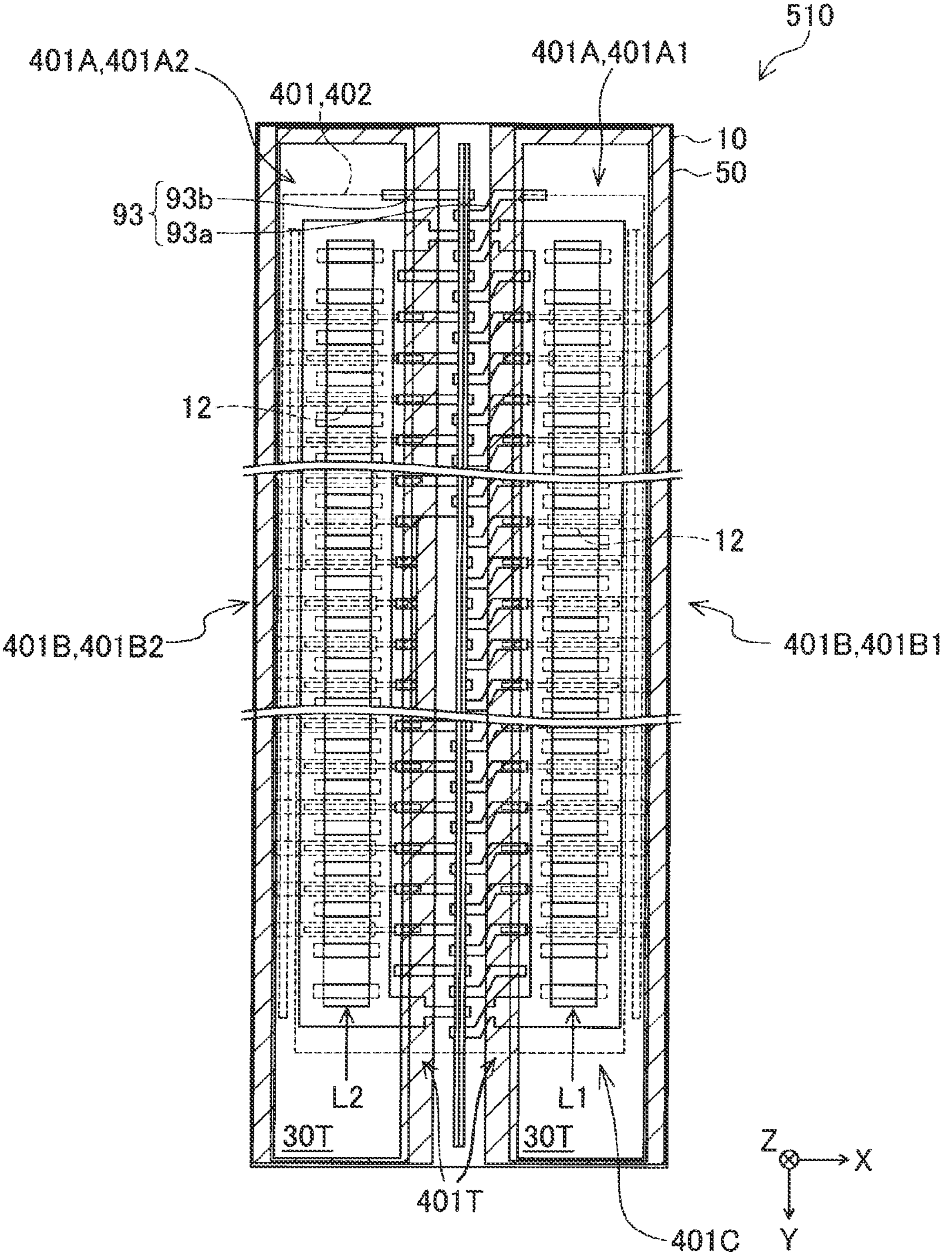
FIG. 9 is an explanatory view showing the disposition relationship between a detection resistor and a sealing substrate in a plan view.

FIG. 9 is an explanatory view showing the disposition relationship between the detection resistor 401 and the sealing substrate 30 in a plan view. In FIG. 9, the position of the wall portion 30W of the sealing substrate 30 is hatched for easy understanding of the technique. In addition, the part surrounded by the wall portion 30W corresponds to the ceiling portion 30T of the sealing substrate 30. The overlapping part 401T shown in FIG. 9 indicates a part overlapping the wall portion 30W of the sealing substrate 30 in the detection resistor 401 in a plan view. The overlapping part 401T is a part of the third extending part 401C in the detection resistor 401. On the other hand, the overlapping part 401T does not exist in the first extending part 401A and the second extending part 401B. In the present embodiment, the detection resistor 401 is provided so that a part where the detection resistor 401 and the wall portion 30W overlap is shorter than a part where the detection resistor 401 and the wall portion 30W do not overlap in a plan view.

In the present embodiment, the detection resistor 401 is further provided so that the part where the detection resistor 401 and the ceiling portion 30T overlap is longer than the part where the detection resistor 401 and the ceiling portion 30T do not overlap. That is, the detection resistor 401 is configured so that the number of parts disposed inside the wall portion 30W of the sealing substrate 30 is larger than the number of the other parts. According to the liquid discharge head 510 configured in this way, by increasing the part covered with the sealing substrate 30 in the detection resistor 401, it is possible to suppress the detection resistor 401 from being exposed to the outside air, foreign matter, or the like. However, the present disclosure is not limited thereto and may be configured so that a side of the part disposed outside the wall portion 30W of the sealing substrate 30 is larger than the other part in the detection resistor 401.

As shown in FIG. 7, in the present embodiment, the detection resistor 401 is provided in a state of being exposed in the groove portion 70G provided in the piezoelectric body 70. In addition, in FIGS. 4, 6, and 9, the groove portion 70G is not shown. The groove portion 70G is provided at a position corresponding to a position where, in the detection resistor 401, the second extending part 401B and the third extending part 401C are disposed, and is not provided at a position corresponding to a position where the first extending part 401A is disposed. According to the liquid discharge head 510 configured in this way, by covering the detection resistor 401 with an air layer having a low thermal conductivity, it is possible to reduce or prevent the heat of the detection resistor 401 from being dissipated. However, the groove portion 70G does not necessarily have to be provided, and the detection resistor 401 may be disposed, for example, in a state of being covered with the piezoelectric body 70.

As described above, the liquid discharge head 510 of the present embodiment includes the pressure chamber substrate 10 that is provided with the plurality of pressure chambers 12, the first electrode 60 as the individual electrode that is individually provided for the plurality of pressure chambers 12, a second electrode 80 as the common electrode that is commonly provided for the plurality of pressure chambers 12, the piezoelectric body 70 that is provided between the individual electrode and the common electrode for applying the pressure to the liquid in the pressure chambers 12, the individual lead electrode 91 and the common lead electrode 92 as the drive wirings that are electrically coupled to the individual electrode and the common electrode, and apply the voltage for driving the piezoelectric body 70, the detection resistor 401 for detecting the temperature of the ink in the pressure chambers 12, and the sealing substrate 30 that has the wall portion 30W and the ceiling portion 30T, and protects the piezoelectric body 70 by the wall portion 30W and the ceiling portion 30T. The detection resistor 401 is provided so that the part overlapping the wall portion 30W is shorter than the part not overlapping the wall portion 30W when viewed along the lamination direction of the piezoelectric body 70, the upper electrode, and the lower electrode. According to the liquid discharge head 510 of the present embodiment, it is possible to avoid the wall portion 30W or the like from being disposed above the detection resistor 401, and it is possible to suppress the heat of the detection resistor 401 from being dissipated via the wall portion 30W or the like. As a result, the detection accuracy of the electric resistance value by the detection resistor 401 can be improved, so that the temperature detection accuracy of the ink in the pressure chamber 12 by the detection resistor 401 can be improved.

According to the liquid discharge head 510 of the present embodiment, the detection resistor 401 is provided so that the part overlapping the ceiling portion 30T is longer than the part not overlapping the ceiling portion 30T when viewed along the lamination direction. According to the liquid discharge head 510 configured in this way, by increasing the part covered with the sealing substrate 30 in the detection resistor 401, it is possible to suppress the detection resistor 401 from being exposed to the outside air, foreign matter, or the like.

In the liquid discharge head 510 of the present embodiment, the detection resistor 401 is formed of the same material as the individual electrode. According to the liquid discharge head 510 of the aspect, the detection resistor 401 can be formed in a process of forming the individual electrode, so that the cost can be reduced by simplifying the manufacturing process.

In the liquid discharge head 510 of the present embodiment, the detection resistor 401 is provided in a state of being exposed in the groove portion 70G provided in the piezoelectric body 70. According to the liquid discharge head 510 of the aspect, by covering the detection resistor 401 with the air layer, it is possible to reduce or prevent the heat of the detection resistor 401 from being dissipated.

According to the liquid discharge head 510 of the present embodiment, when the direction in which the plurality of pressure chambers 12 are arranged is set as the arrangement direction and the direction orthogonal to both the arrangement direction and the lamination direction is the intersection direction, the detection resistor 401 includes the first extending part 401A that extends along the intersection direction at the position on one side in the arrangement direction with respect to the plurality of pressure chambers 12, and the second extending part 401B that is continuous from the first extending part 401A and extends along the arrangement direction. By disposing the second extending part 401B along the arrangement direction of the plurality of pressure chambers 12, the detection resistor 401 can be efficiently disposed from the viewpoint of the temperature detection of the plurality of pressure chambers 12.

According to the liquid discharge head 510 of the present embodiment, the detection resistor 401 further includes the third extending part 401C that extends along the intersection direction at a position on the other side in the arrangement direction with respect to the plurality of pressure chambers 12. By disposing the detection resistor 401 so as to surround the plurality of pressure chambers 12, the detection resistor 401 can be efficiently disposed.

The liquid discharge device 500 of the present embodiment includes the liquid discharge head 510, and the control section 580 that controls the discharge operation of the liquid discharge head 510. Therefore, it is possible to provide the liquid discharge device 500 capable of improving the detection accuracy of the electric resistance value by the detection resistor 401 and improving the temperature detection accuracy of the ink in the pressure chamber 12 by the detection resistor 401.

B. Second Embodiment

Figure 10:
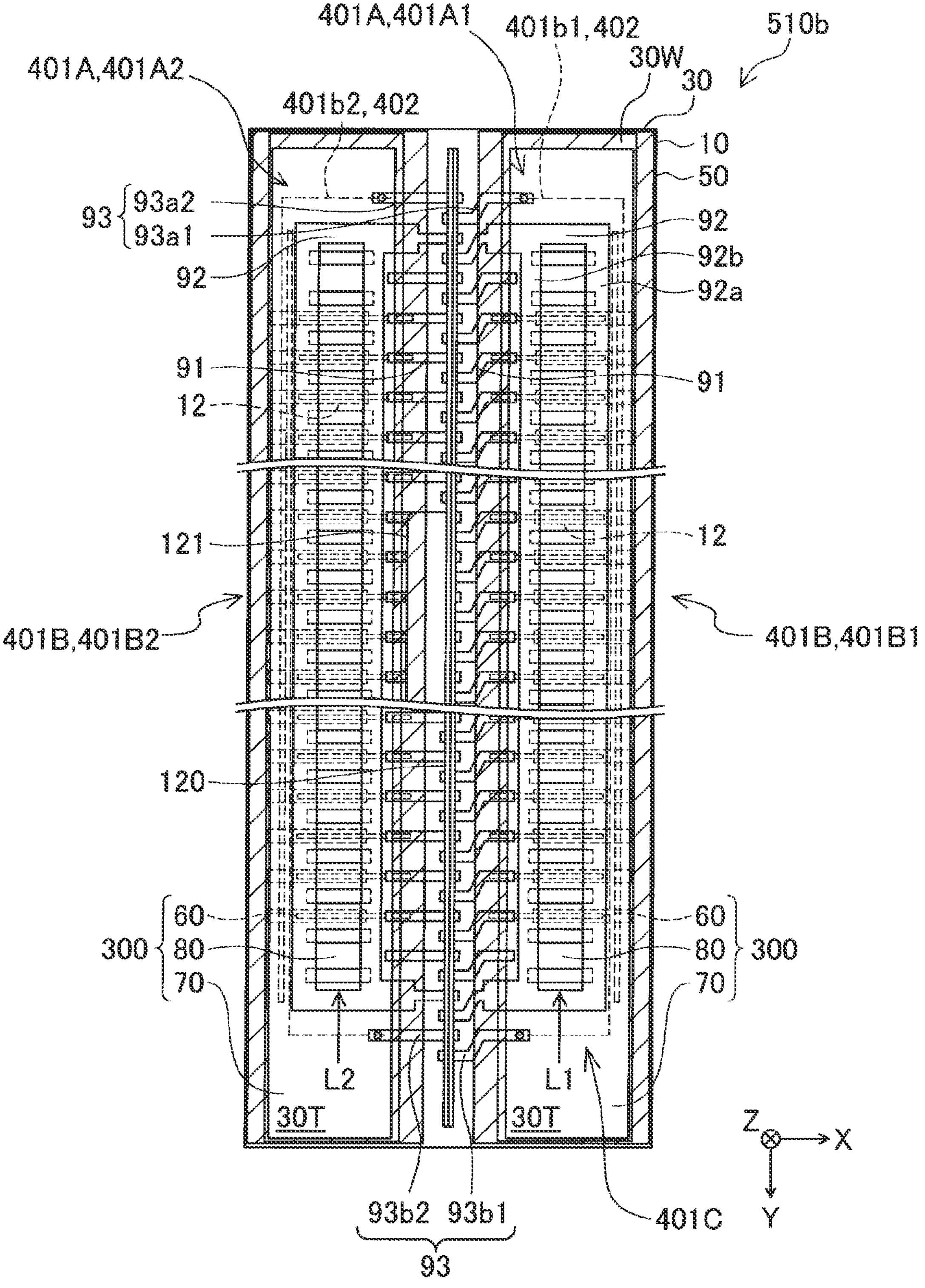
FIG. 10 is an explanatory view showing a configuration of a liquid discharge head as a second embodiment in a plan view.

FIG. 10 is an explanatory view showing a configuration of a liquid discharge head 510*b* as a second embodiment of the present disclosure in a plan view. As shown in FIG. 10, the liquid discharge head 510*b* as the second embodiment is different from the liquid discharge head 510 of the first embodiment in a fact of being configured so that the overlapping part 401T, which is the part overlapping the wall portion 30W of the sealing substrate 30, does not exist in the detection resistor 401, and the other configurations are the same as in the liquid discharge head 510 of the first embodiment.

As shown in FIG. 10, in the liquid discharge head 510*b* as the second embodiment, the measurement lead electrode 93 includes wiring portions 93*a*1 and 93*a*2 positioned on the −Y direction side of the pressure chamber substrate 10, which are configured similar to the wiring portion 93*a*, and wiring portions 93*b*1 and 93*b*2 positioned on the +Y direction side of the pressure chamber substrate 10, which are configured similar to the wiring portion 93*b*, instead of the wiring portions 93*a* and 93*b*. The liquid discharge head 510*b* includes a detection resistor 401*b*1 for detecting the temperature of the ink in the pressure chambers 12 included in the first pressure chamber row L1, and a detection resistor 401*b*2 for detecting the temperature of the ink in the pressure chambers 12 included in the second pressure chamber row L2, instead of the detection resistor 401. The detection resistor 401*b*1 is electrically coupled to the wiring portion 93*a*1 and the wiring portion 93*b*1, and is electrically coupled to the relay substrate 120. The detection resistor 401*b*2 is electrically coupled to the wiring portion 93*a*2 and the wiring portion 93*b*2, and is electrically coupled to the relay substrate 120. According to the liquid discharge head 510 configured in this way, for example, as in the first pressure chamber row L1 and the second pressure chamber row L2, the temperature of the ink inside of each predetermined pressure chamber group having the plurality of pressure chambers 12 can be individually detected.

In the present embodiment, the wiring portions 93*a*1, 93*a*2, 93*b*1, and 93*b*2 and the detection resistors 401*b*1 and 401*b*2 are electrically coupled to each other at a position inside the wall portion 30W of the sealing substrate 30 in a plan view. Further, the detection resistors 401*b*1 and 401*b*2 are configured so that the overlapping part 401T, which is the part overlapping the wall portion 30W of the sealing substrate 30 in a plan view, does not exist. That is, the detection resistors 401*b*1 and 401*b*2 are provided so as not to overlap the wall portion 30W in a plan view. Further, the detection resistors 401*b*1 and 401*b*2 are disposed at the position inside the wall portion 30W of the sealing substrate 30 in a plan view, and are provided so as to overlap only the ceiling portion 30T.

According to the liquid discharge head 510*b* of the present embodiment, the detection resistors 401*b*1 and 401*b*2 are provided so as not to overlap the wall portion 30W in a plan view. Therefore, it is possible to more reliably suppress the heat of the detection resistors 401*b*1 and 401*b*2 from being dissipated via the wall portion 30W or the like, and it is possible to further improve the temperature detection accuracy of the ink in the pressure chamber 12 by the detection resistors 401*b*1 and 401*b*2.

According to the liquid discharge head 510*b* of the present embodiment, the detection resistors 401*b*1 and 401*b*2 are provided so as to overlap only the ceiling portion 30T in a plan view. According to the liquid discharge head 510 configured in this way, by covering the entire detection resistors 401*b*1 and 401*b*2 with the sealing substrate 30, it is possible to more reliably suppress the detection resistors 401*b*1 and 401*b*2 from being exposed to the outside air or the like.

C. Third Embodiment

Figure 11:
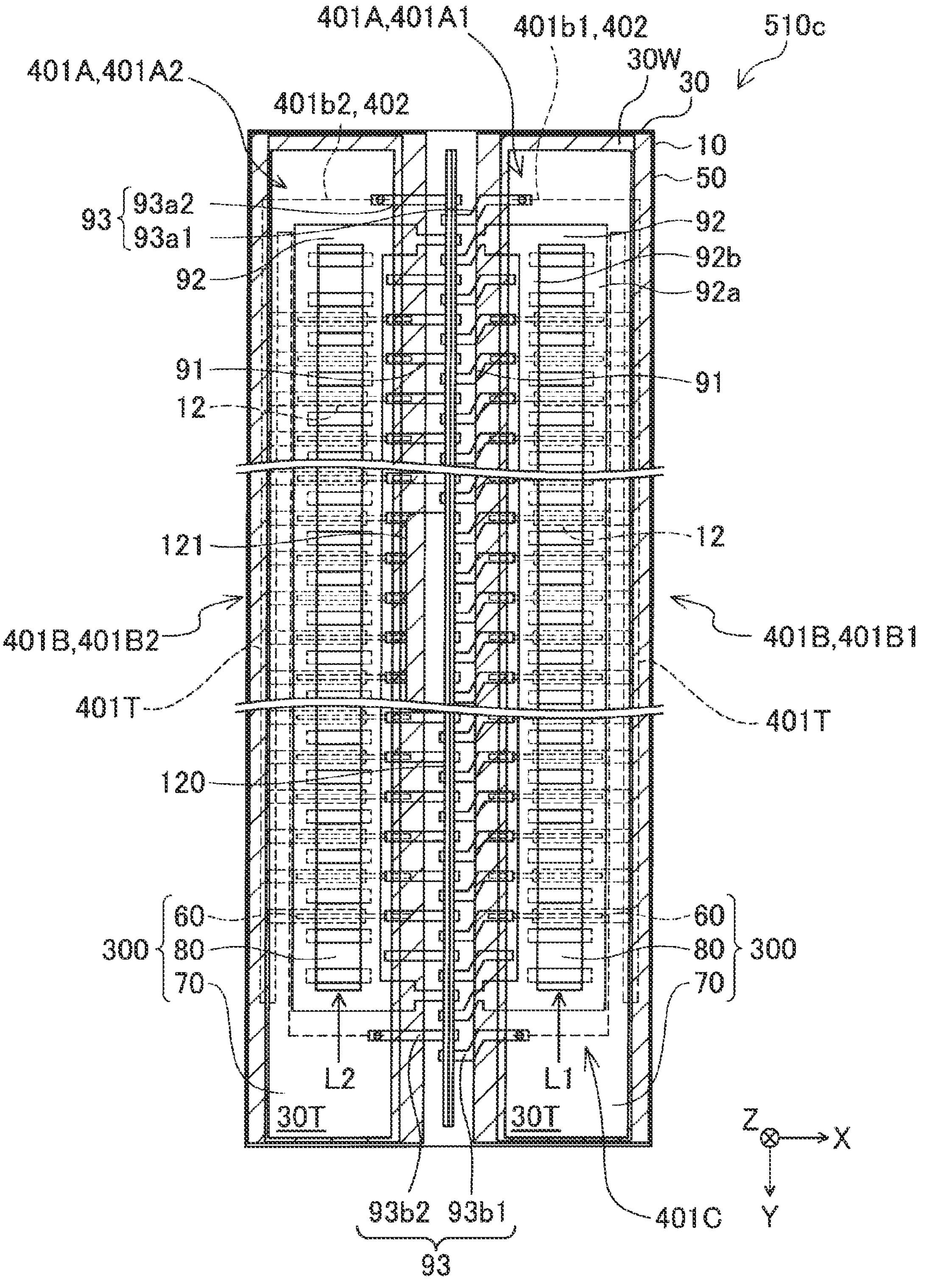
FIG. 11 is an explanatory view showing a configuration of a liquid discharge head as a third embodiment in a plan view.

FIG. 11 is an explanatory view showing the configuration of a liquid discharge head 510*c* as a third embodiment of the present disclosure in a plan view. As shown in FIG. 11, similar to the second embodiment, the liquid discharge head 510*c* as the third embodiment is different from the liquid discharge head 510 of the first embodiment in a fact that the measurement lead electrode 93 includes wiring portions 93*a*1, 93*a*2, 93*b*1, and 93*b*2 instead of the wiring portions 93*a* and 93*b*, and includes detection resistors 401*b*1 and 401*b*2 instead of the detection resistor 401. Further, a fact that the position of the overlapping part 401T, which is the part overlapping the wall portion 30W of the sealing substrate 30 is different in the detection resistor 401*b*1 and 401*b*2, is different, and the other configurations are the same as in the liquid discharge head 510 of the first embodiment.

As shown in FIG. 11, in the present embodiment, the overlapping part 401T is a part of the second extending part 401B in the detection resistors 401*b*1 and 401*b*2. The overlapping part 401T does not exist in the first extending part 401A and the third extending part 401C. Further, in the detection resistors 401*b*1 and 401*b*2, the part overlapping the ceiling portion 30T is longer than the part which is not overlapping the ceiling portion 30T. In this way, the overlapping part 401T may exist in any part of the detection resistors 401*b*1 and 401*b*2. The same advantage as in the first embodiment can be obtained even in the liquid discharge head 510*c* of the aspect.

D. Fourth Embodiment

Figure 12:
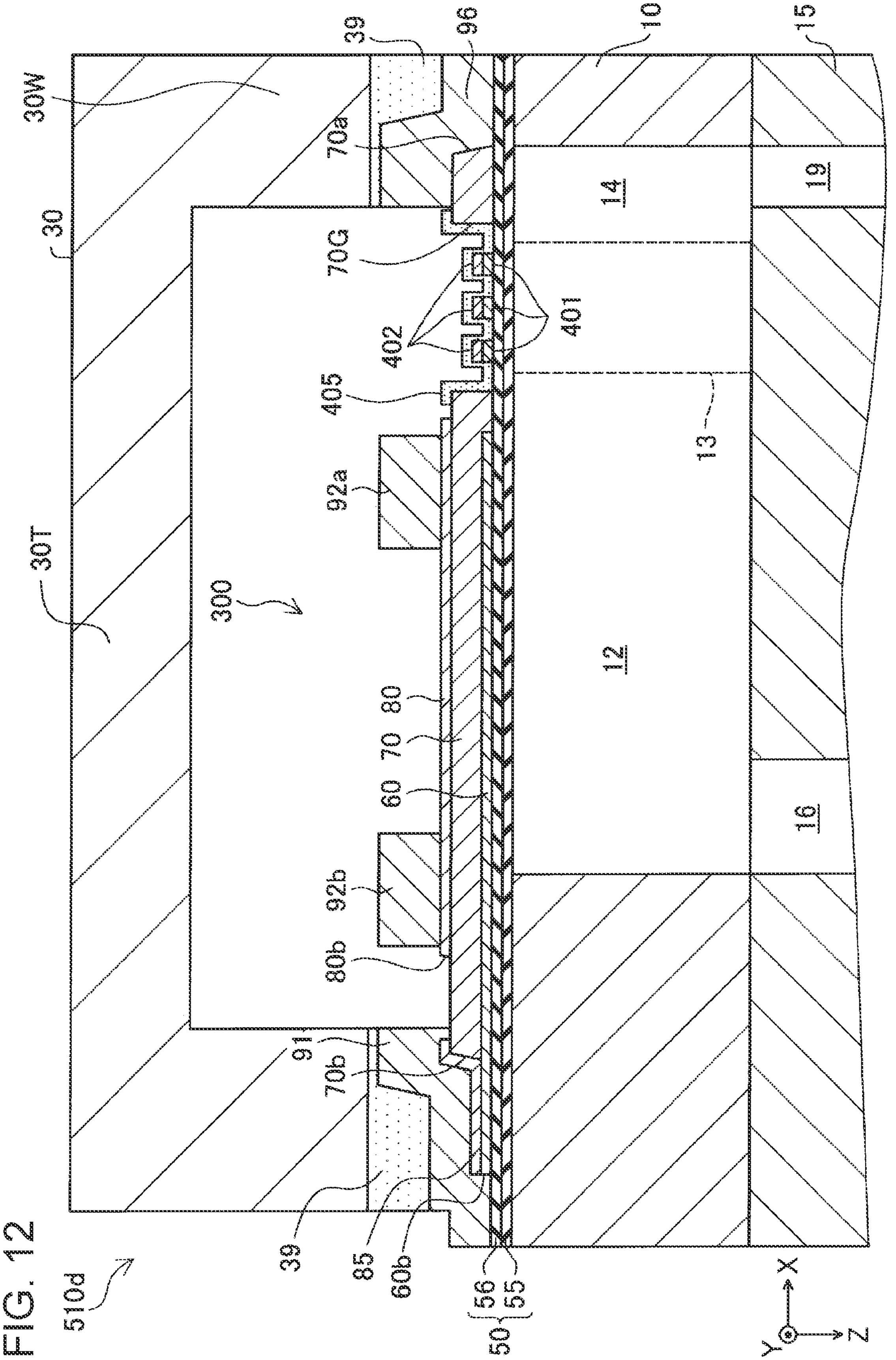
FIG. 12 is an explanatory view showing a configuration of a liquid discharge head as a fourth embodiment in a cross-sectional view.

FIG. 12 is an explanatory view showing a configuration of a liquid discharge head 510*d* as a fourth embodiment of the present disclosure in a cross-sectional view. As shown in FIG. 12, a liquid discharge head 510*d* as the fourth embodiment is different from the liquid discharge head 510 of the first embodiment in a fact that the detection resistor 401 is provided in a state of being covered with the insulator film 405 in the groove portion 70G provided in the piezoelectric body 70, and the other configurations are the same as in the liquid discharge head 510 of the first embodiment.

The insulator film 405 is formed above the detection resistor 401 provided in the groove portion 70G, and covers the detection resistor 401. The insulator film 405 functions as a protective film that protects the detection resistor 401 from dew condensation, foreign matter, and the like. The insulator is used to prevent a short circuit between the wirings of the detection resistor 401. The insulator film 405 can be formed, for example, by using the same material as the adhesive 39. With the configuration, the insulator film 405 can be formed in the process of forming the adhesive 39, so that the cost can be reduced by simplifying the manufacturing process. In addition, the insulator film 405 is not limited to the same material as the adhesive 39, and may be formed by using another insulator such as silicon oxide or zirconium oxide. When the short circuit of the detection resistor 401 does not occur as in a case where the detection resistor 401 is formed in a straight line, the protective film using a conductor, such as metal, may be formed instead of the insulator film 405.

In the liquid discharge head 510*d* of the present embodiment, the detection resistor 401 is provided in a state of being covered with the insulator film 405 in the groove portion 70G provided in the piezoelectric body 70. According to the liquid discharge head 510*d* of the aspect, it is possible to suppress the heat of the detection resistor 401 from being dissipated via the wall portion 30W or the like, and protect the detection resistor 401 from dew condensation and foreign matter by the insulator film 405.

E. Other Embodiments (E1) In the first embodiment, the second electrode 80 as the common electrode is provided above the piezoelectric body 70, and the first electrode 60 as the individual electrode is provided below the piezoelectric body 70. On the other hand, the common electrode may be the lower electrode provided below the piezoelectric body 70, and the individual electrode may be the upper electrode provided above the piezoelectric body 70. In this case, it is preferable that the detection resistor 401 is formed by using the same material as the lower electrode as the common electrode provided below the piezoelectric body 70. The detection resistor 401 can be formed in a process of forming the common electrode, so that the cost can be reduced by simplifying the manufacturing process.

(E2) In the first embodiment, the material of the detection resistor 401 is platinum (Pt) and is formed of the same material as the first electrode 60. On the other hand, the detection resistor 401 may be formed of the same material as any of the common electrode and the drive wiring while being not limited to the individual electrode. For example, the detection resistor 401 may be formed of the same material as the second electrode 80 which is the common electrode. According to the liquid discharge head 510 of the aspect, for example, the detection resistor 401 can be formed in a process of forming the second electrode 80, so that the cost can be reduced by simplifying the manufacturing process. Further, the detection resistor 401 may be formed of the same material as the individual lead electrode 91 and the common lead electrode 92 which are drive wirings. According to the liquid discharge head 510 of the aspect, for example, the detection resistor 401 can be formed in a process of forming the individual lead electrode 91 and the common lead electrode 92, so that the cost can be reduced by simplifying the manufacturing process.

(E3) In the first embodiment, an example is shown in which the detection resistor 401 has the first extending part 401A electrically coupled to the measurement lead electrode 93 which is the first wiring portion, the second extending part 401B which is continuous from the first extending part 401A, and the third extending part 401C. On the other hand, the third extending part 401C may be omitted, and only the first extending part 401A and the second extending part 401B may be provided. In this case, for example, the wiring portion 93*b* may be provided so as to be adjacent to the wiring portion 93*a*, and two first extending parts 401A including the first extending part 401A coupled to the wiring portion 93*a* and the first extending part 401A coupled to the wiring portion 93*b* may be provided. The second extending part 401B coupled to the two first extending parts 401A and having a shape reciprocating along the arrangement direction may be provided.

(E4) In the first embodiment, an example is shown in which the wiring portions 93*a* and 93*b* are disposed on the −Y direction side with respect to the plurality of pressure chambers 12, and the first extending part 401A is disposed in the −Y direction side with respect to the plurality of pressure chambers 12. On the other hand, the wiring portions 93*a* and 93*b* and the first extending part 401A may be disposed on the +Y direction side with respect to the plurality of pressure chambers 12.

F. Other Aspects

The present disclosure is not limited to the above-described embodiments, and can be realized in various configurations without departing from the gist of the present disclosure. For example, technical features in the embodiments corresponding to technical features in respective aspects described in outline of the present disclosure can be appropriately replaced or combined in order to solve some or all of the above-described problems or achieve some or all of the above-described effects. Further, when the technical features are not described as essential in the present specification, the technical features can be appropriately deleted.

(1) According to one aspect of the present disclosure, there is provided a liquid discharge head. The liquid discharge head includes a pressure chamber substrate that is provided with a plurality of pressure chambers; an individual electrode that is individually provided for the plurality of pressure chambers; a common electrode that is commonly provided for the plurality of pressure chambers; a piezoelectric body that is provided between the individual electrode and the common electrode for applying pressure to liquid in the pressure chambers; a drive wiring that is electrically coupled to the individual electrode and the common electrode, and applies a voltage for driving the piezoelectric body; a detection resistor that is formed of the same material as any of the individual electrode, the common electrode, and the drive wiring for detecting temperature of the liquid in the pressure chambers; and a sealing substrate that has a wall portion and a ceiling portion, and protects the piezoelectric body by the wall portion and the ceiling portion. The detection resistor is provided so that a part overlapping the wall portion is shorter than a part not overlapping the wall portion when viewed along a lamination direction of the piezoelectric body, the individual electrode, and the common electrode. According to the liquid discharge head of the aspect, the heat of the detection resistor is suppressed from being dissipated via the wall portion by avoiding the wall portion of the sealing substrate from being disposed at a position overlapping the detection resistor. Therefore, the detection accuracy of an electric resistance value by the detection resistor can be improved, so that temperature detection accuracy by the detection resistor can be improved.

(2) In the liquid discharge head of the aspect, the detection resistor may be provided so as not to overlap the wall portion when viewed along the lamination direction. According to the liquid discharge head of the aspect, it is possible to more reliably suppress the heat of the detection resistor from being dissipated via the wall portion or the like, and to further improve the temperature detection accuracy by the detection resistor.

(3) In the liquid discharge head of the aspect, the detection resistor may be provided so that a part overlapping the ceiling portion is longer than a part not overlapping the ceiling portion when viewed along the lamination direction. According to the liquid discharge head of the aspect, by increasing the part covered with the sealing substrate in the detection resistor, it is possible to suppress the detection resistor from being exposed to the outside air, foreign matter, or the like.

(4) In the liquid discharge head of the aspect, the detection resistor may be provided so as to overlap only the ceiling portion when viewed along the lamination direction.

According to the liquid discharge head of the aspect, by covering the entire detection resistor with the sealing substrate, it is possible to more reliably suppress the detection resistor from being exposed to the outside air, foreign matter, or the like.

(5) In the liquid discharge head of the aspect, the detection resistor may be formed of the same material as the individual electrode. According to the liquid discharge head of the aspect, the detection resistor can be formed in the process of forming the individual electrode, so that the cost can be reduced by simplifying the manufacturing process.

(6) In the liquid discharge head of the aspect, the common electrode may be provided above the piezoelectric body, and the individual electrode may be provided below the piezoelectric body.

(7) In the liquid discharge head of the aspect, the detection resistor may be provided in a state of being exposed in a groove portion provided in the piezoelectric body. According to the liquid discharge head of the aspect, by covering the detect6~ion resistor with the air layer, it is possible to reduce or prevent the heat of the detection resistor from being dissipated.

(8) In the liquid discharge head of the aspect, the detection resistor may be provided in a state of being covered with an insulator in a groove portion provided in the piezoelectric body. According to the liquid discharge head of the aspect, it is possible to suppress the heat of the detection resistor from being dissipated via the wall portion or the like, and protect the detection resistor from dew condensation and foreign matter by the insulator film.

(9) In the liquid discharge head of the aspect, when a direction in which the plurality of pressure chambers are arranged is set as an arrangement direction and a direction orthogonal to both the arrangement direction and the lamination direction is set as an intersection direction, the detection resistor may include a first extending part that extends along the intersection direction at a position on one side in the arrangement direction with respect to the plurality of pressure chambers, and a second extending part that is continuous from the first extending part and extends along the arrangement direction. According to the liquid discharge head of the aspect, by disposing the second extending part along the arrangement direction of the plurality of pressure chambers, the detection resistor can be efficiently disposed from the viewpoint of the temperature detection of the plurality of pressure chambers.

(10) In the liquid discharge head of the aspect, the detection resistor may further include a third extending part that extends along the intersection direction at a position on the other side in the arrangement direction with respect to the plurality of pressure chambers. According to the liquid discharge head of the aspect, by disposing the detection resistor so as to surround the plurality of pressure chambers, the detection resistor can be efficiently disposed.

(11) In the liquid discharge head of the aspect, the common electrode may contain iridium, and the individual electrode may contain platinum.

(12) According to another aspect of the present disclosure, there is provided a liquid discharge device. The liquid discharge device includes the liquid discharge head of the aspect, and a control section that controls a discharge operation of the liquid discharge head. According to the liquid discharge device of the aspect, it is possible to provide a liquid discharge device capable of suppressing heat of the detection resistor from being dissipated via the wall portion and improving the temperature detection accuracy by the detection resistor.

The present disclosure can also be realized in various aspects other than the liquid discharge device and the liquid discharge head. For example, it is possible to realize the present disclosure with an aspect of a method for manufacturing a liquid discharge head, a method for manufacturing a liquid discharge device, or the like.

The present disclosure is not limited to the ink jet method, and can be applied to any liquid discharge device that discharges a liquid other than the ink and a liquid discharge head that is used for the liquid discharge device. For example, the present disclosure can be applied to the following various liquid discharge devices and liquid discharge heads thereof.

(1) An image recording device such as a facsimile device.

(2) A color material discharge device used for manufacturing a color filter for an image display device such as a liquid crystal display.

(3) An electrode material discharge device used for forming electrodes of an organic Electro Luminescence (EL) display, a Field Emission Display (FED), or the like.

(4) A liquid discharge device that discharges a liquid containing a bioorganic substance used for manufacturing a biochip.

(5) A sample discharge device as a precision pipette.

(6) A lubricating oil discharge device.

(7) A resin liquid discharge device.

(8) A liquid discharge device that discharges lubricating oil with pinpoint to a precision machine such as a watch or a camera.

(9) A liquid discharge device that discharges a transparent resin liquid, such as an ultraviolet curable resin liquid, onto a substrate in order to form a micro hemispherical lens (optical lens) or the like used for an optical communication element or the like.

(10) A liquid discharge device that discharges an acidic or alkaline etching liquid for etching a substrate or the like.

(11) A liquid discharge device including a liquid consumption head that discharges any other minute amount of droplets.

Further, the "liquid" may be any material that can be consumed by the liquid discharge device. For example, the "liquid" may be a material in a state when a substance is liquefied, and the "liquid" includes a liquid state material with high or low viscosity and a liquid state material, such as a sol, gel water, other inorganic solvent, organic solvent, solution, liquid resin, and liquid metal (metal melt). Further, the "liquid" includes not only a liquid as a state of a substance but also a liquid in which particles of a functional material made of a solid substance, such as a pigment or a metal particle, are dissolved, dispersed, or mixed in a solvent. Further, the following is mentioned as a typical example of a liquid.

(1) Adhesive main agent and curing agent.

(2) Paint-based paints and diluents, clear paints and diluents.

(3) Main solvent and diluting solvent containing cells of ink for cells.

(4) Metallic leaf pigment dispersion liquid and diluting solvent of ink (metallic ink) that develops metallic luster.

(5) Gasoline/diesel and biofuel for vehicle fuel.

(6) Main ingredients and protective ingredients of medicine.

(7) Light Emitting Diode (LED) fluorescent material and encapsulant.

What is claimed is:

1. A liquid discharge head comprising:

a pressure chamber substrate that is provided with a plurality of pressure chambers;

an individual electrode that is individually provided for the plurality of pressure chambers;

a common electrode that is commonly provided for the plurality of pressure chambers;

a piezoelectric body that is provided between the individual electrode and the common electrode for applying pressure to liquid in the pressure chambers;

a drive wiring that is electrically coupled to the individual electrode and the common electrode, and applies a voltage for driving the piezoelectric body;

a detection resistor that is formed of the same material as any of the individual electrode, the common electrode, and the drive wiring for detecting temperature of the liquid in the pressure chambers; and a sealing substrate that has a wall portion and a ceiling portion, and protects the piezoelectric body by the wall portion and the ceiling portion, wherein the detection resistor is provided so that a part overlapping the wall portion is shorter than a part not overlapping the wall portion when viewed along a lamination direction of the piezoelectric body, the individual electrode, and the common electrode.

2. The liquid discharge head according to claim 1, wherein the detection resistor is provided so that a part overlapping the ceiling portion is longer than a part not overlapping the ceiling portion when viewed along the lamination direction.

3. The liquid discharge head according to claim 2, wherein the detection resistor is provided so as to overlap only the ceiling portion when viewed along the lamination direction.

4. The liquid discharge head according to claim 1, wherein the detection resistor is formed of the same material as the individual electrode.

5. The liquid discharge head according to claim 4, wherein the common electrode is provided above the piezoelectric body, and the individual electrode is provided below the piezoelectric body.

6. The liquid discharge head according to claim 5, wherein the detection resistor is provided in a state of being exposed in a groove portion provided in the piezoelectric body.

7. The liquid discharge head according to claim 5, wherein the detection resistor is provided in a state of being covered with an insulator in a groove portion provided in the piezoelectric body.

8. The liquid discharge head according to claim 1, wherein when a direction in which the plurality of pressure chambers are arranged is set as an arrangement direction and a direction orthogonal to both the arrangement direction and the lamination direction is set as an intersection direction, the detection resistor includes a first extending part that extends along the intersection direction at a position on one side in the arrangement direction with respect to the plurality of pressure chambers, and a second extending part that is continuous from the first extending part and extends along the arrangement direction.

9. The liquid discharge head according to claim 8, wherein the detection resistor further includes a third extending part that extends along the intersection direction at a position on the other side in the arrangement direction with respect to the plurality of pressure chambers.

10. The liquid discharge head according to claim 1, wherein the common electrode contains iridium, and the individual electrode contains platinum.

11. A liquid discharge device comprising:

the liquid discharge head according to claim 1; and a control section that controls a discharge operation of the liquid discharge head.

12. A liquid discharge head comprising:

a pressure chamber substrate that is provided with a plurality of pressure chambers;

an individual electrode that is individually provided for the plurality of pressure chambers;

a common electrode that is commonly provided for the plurality of pressure chambers;

a piezoelectric body that is provided between the individual electrode and the common electrode for applying pressure to liquid in the pressure chambers;

a drive wiring that is electrically coupled to the individual electrode and the common electrode, and applies a voltage for driving the piezoelectric body;

a detection resistor that is formed of the same material as any of the individual electrode, the common electrode, and the drive wiring for detecting temperature of the liquid in the pressure chambers; and a sealing substrate that has a wall portion and a ceiling portion, and protects the piezoelectric body by the wall portion and the ceiling portion, wherein the detection resistor is provided so as not to overlap the wall portion when viewed along the lamination direction.

* * * * *